United States Patent
Miltonberger

(10) Patent No.: US 10,115,111 B2
(45) Date of Patent: *Oct. 30, 2018

(54) MODELING USERS FOR FRAUD DETECTION AND ANALYSIS

(75) Inventor: Tom Miltonberger, Los Altos, CA (US)

(73) Assignee: Guardian Analytics, Inc., Mountain View, CA (US)

(*) Notice: Subject to any disclaimer, the term of this patent is extended or adjusted under 35 U.S.C. 154(b) by 1615 days.

This patent is subject to a terminal disclaimer.

(21) Appl. No.: 12/483,887

(22) Filed: Jun. 12, 2009

(65) Prior Publication Data

US 2010/0094767 A1 Apr. 15, 2010

Related U.S. Application Data

(60) Provisional application No. 61/061,095, filed on Jun. 12, 2008, provisional application No. 61/061,096, filed on Jun. 12, 2008, provisional application No. 61/061,092, filed on Jun. 12, 2008, provisional application No. 61/061,097, filed on Jun. 12, 2008.

(51) Int. Cl.

| | |
|---|---|
| G06Q 99/00 | (2006.01) |
| G06Q 30/00 | (2012.01) |
| G06Q 10/06 | (2012.01) |
| G06Q 10/10 | (2012.01) |
| G06Q 20/40 | (2012.01) |
| G06Q 40/02 | (2012.01) |
| G06Q 50/26 | (2012.01) |
| G06N 5/02 | (2006.01) |

(Continued)

(52) U.S. Cl.
CPC ........... *G06Q 30/0185* (2013.01); *G06N 5/02* (2013.01); *G06N 7/005* (2013.01); *G06Q 10/067* (2013.01); *G06Q 10/10* (2013.01); *G06Q 20/40* (2013.01); *G06Q 20/4016* (2013.01); *G06Q 30/0225* (2013.01); *G06Q 40/02* (2013.01); *G06Q 50/265* (2013.01)

(58) Field of Classification Search
CPC .. G06Q 10/067; G06Q 10/10; G06Q 20/4016; G06Q 30/0185; G06Q 30/0225; G06N 5/02; G06N 7/005
USPC ........................ 703/2; 705/27.1, 38; 235/380
See application file for complete search history.

(56) References Cited

U.S. PATENT DOCUMENTS

| | | | |
|---|---|---|---|
| 7,580,813 B2 * | 8/2009 | Thiesson | G06F 17/18 700/31 |
| 8,140,301 B2 * | 3/2012 | Abe | G05B 17/02 703/2 |

(Continued)

OTHER PUBLICATIONS

Edge, M. E., Sampaio, P. R., & Choudhary, M. (2007). Towards a Proactive Fraud Management Framework for Financial Data Streams. Third IEEE International Symposium on Dependable, Autonomic and Secure Computing (DASC 2007), 55-62. (Year: 2007).*

*Primary Examiner* — William S Brockington, III
(74) *Attorney, Agent, or Firm* — The Webb Law Firm

(57) ABSTRACT

Systems and methods are provided for predicting expected behavior of a user in an account. The systems and methods automatically generate a causal model corresponding to a user. The systems and methods estimate a plurality of components of the causal model using event parameters of a first set of events undertaken by the user in an account of the user. The systems and methods predict expected behavior of the user during a second set of events using the causal model.

33 Claims, 16 Drawing Sheets

(51) Int. Cl.
*G06Q 30/02* (2012.01)
*G06N 7/00* (2006.01)

(56) References Cited

U.S. PATENT DOCUMENTS

| | | | | |
|---|---|---|---|---|
| 2002/0194119 | A1* | 12/2002 | Wright | G06Q 20/04 705/38 |
| 2005/0149348 | A1* | 7/2005 | Baum-Waidner | G06Q 10/10 705/325 |
| 2006/0041464 | A1* | 2/2006 | Powers | G06Q 20/04 235/380 |
| 2007/0220604 | A1* | 9/2007 | Long | G06F 21/55 726/22 |
| 2007/0239604 | A1* | 10/2007 | O'Connell | G06Q 30/06 705/50 |
| 2008/0270088 | A1* | 10/2008 | Abe | G05B 17/02 703/2 |
| 2009/0098547 | A1* | 4/2009 | Ghosh | G06F 19/24 435/6.16 |
| 2009/0287623 | A1* | 11/2009 | Martin | G06N 7/005 706/13 |
| 2010/0191513 | A1* | 7/2010 | Listgarten | G06F 19/18 703/2 |
| 2012/0310785 | A1* | 12/2012 | Poulin | G06Q 10/04 705/27.1 |
| 2015/0026027 | A1* | 1/2015 | Priess | G06Q 40/00 705/35 |

* cited by examiner

MODELING USERS FOR FRAUD DETECTION AND ANALYSIS

RELATED APPLICATION

This application claims the benefit of U.S. Patent Application No. 61/061,092, filed Jun. 12, 2008.

This application claims the benefit of U.S. Patent Application No. 61/061,095, filed Jun. 12, 2008.

This application claims the benefit of U.S. Patent Application No. 61/061,096, filed Jun. 12, 2008.

This application claims the benefit of U.S. Patent Application No. 61/061,097, filed Jun. 12, 2008.

TECHNICAL FIELD

The disclosure herein relates generally to fraud detection and analysis. In particular, this disclosure relates to fraud detection using behavior-based modeling.

BACKGROUND

Tracking fraud in the online environment is a hard problem to solve. Fraudster tactics rapidly evolve, and today's sophisticated criminal methods mean online account fraud often doesn't look like fraud at all. In fact, fraudsters can look and behave exactly like a customer might be expected to look and behave. Accurate detection is made even more difficult because today's fraudsters use multi-channel fraud methods that combine both online and offline steps, any one of which looks perfectly acceptable but when taken in combination amount to a fraudulent attack. Identifying truly suspicious events that deserve action by limited fraud resources is like finding a needle in a haystack.

Consequently, customer financial and information assets remain at risk, and the integrity of online channels is at risk. Companies simply do not have the resources to anticipate and respond to every possible online fraud threat. Today's attacks expose the inadequacies of yesterday's online fraud prevention technologies, which cannot keep up with organized fraudster networks and their alarming pace of innovation.

Reactive strategies are no longer effective against fraudsters. Too often, financial institutions learn about fraud when customers complain about losses. It is no longer realistic to attempt to stop fraudsters by defining new detection rules after the fact, as one can never anticipate and respond to every new fraud pattern. Staying in reactive mode makes tracking the performance of online risk countermeasures over time more difficult. Adequate monitoring of trends, policy controls, and compliance requirements continues to elude many institutions.

The conventional technologies that hope to solve the online fraud problem, while often a useful and even necessary security layer, fail to solve the problem at its core. These solutions often borrow technology from other market domains (e.g. credit card fraud, web analytics), then attempt to extend functionality for online fraud detection with mixed results. Often they negatively impact the online user experience.

Conventional alternatives attempting to solve the online fraud problem include multi-factor and risk-based authentication solutions and fraud rule-, fraud indicator- and fraud pattern-based transaction monitoring solutions. The multi-factor and risk-based authentication solutions are ineffective because they typically result in high false detections (false positives) and return non-actionable information. Authentication failure and the need for challenge questions are not accurate indicators of fraud, and challenge rates are too high to be acted upon by limited fraud investigation resources. Their fraud detection capabilities (e.g., device identification, cookies, etc.) do not deliver the performance required and lack the rich behavior models and account history necessary to investigate suspicious activity. Recently fraudsters have demonstrated the ability to circumvent this technology completely.

Fraud rule-, fraud indicator- and fraud pattern-based transaction monitoring solutions are generally always behind the latest fraud techniques. These solutions merely react to known threats instead of recognizing new threats as they happen. They require complicated rules development and maintenance, known fraud "truth sets" for algorithm training, and ongoing "care and feeding" maintenance to try to remain current. As a result, these solutions are unable to spot new fraud types and patterns. Once a breach occurs, most return minimal detail on any given fraud instance, little context, limited characterization of individual user behavior, no visual analytics, less granular risk scoring, and minimal forensics.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

DETAILED DESCRIPTION

Fraud prevention systems and methods are described below for use in the prevention of account fraud and identity theft, providing real-time risk management solutions that protect online and off-line channels. The fraud prevention systems and methods described herein, collectively referred to herein as the fraud prevention system (FPS), support the end-to-end online risk management process with behavior-based modeling and rich analytics. The FPS offers an analytics-based software solution that addresses the entire risk management lifecycle, as described in detail below.

The FPS of an embodiment connects data analytics, the online domain, and fraud expertise by providing predictive models of individual behavior, dynamically adjusting to identify anomalous and suspicious activity, and then providing actionable alerts and rich investigation capabilities as part of a comprehensive risk management solution. The FPS automatically detects new and evolving fraud threats without any requirement for fraud rule/pattern development or ongoing maintenance effort.

In the following description, numerous specific details are introduced to provide a thorough understanding of, and enabling description for, embodiments of the FPS. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

In the descriptions and examples provided herein, a user or customer is an owner of an account, a fraudster is any person that is not the user or account owner and an analyst or employee is the user of the FPS system.

Figure 1:
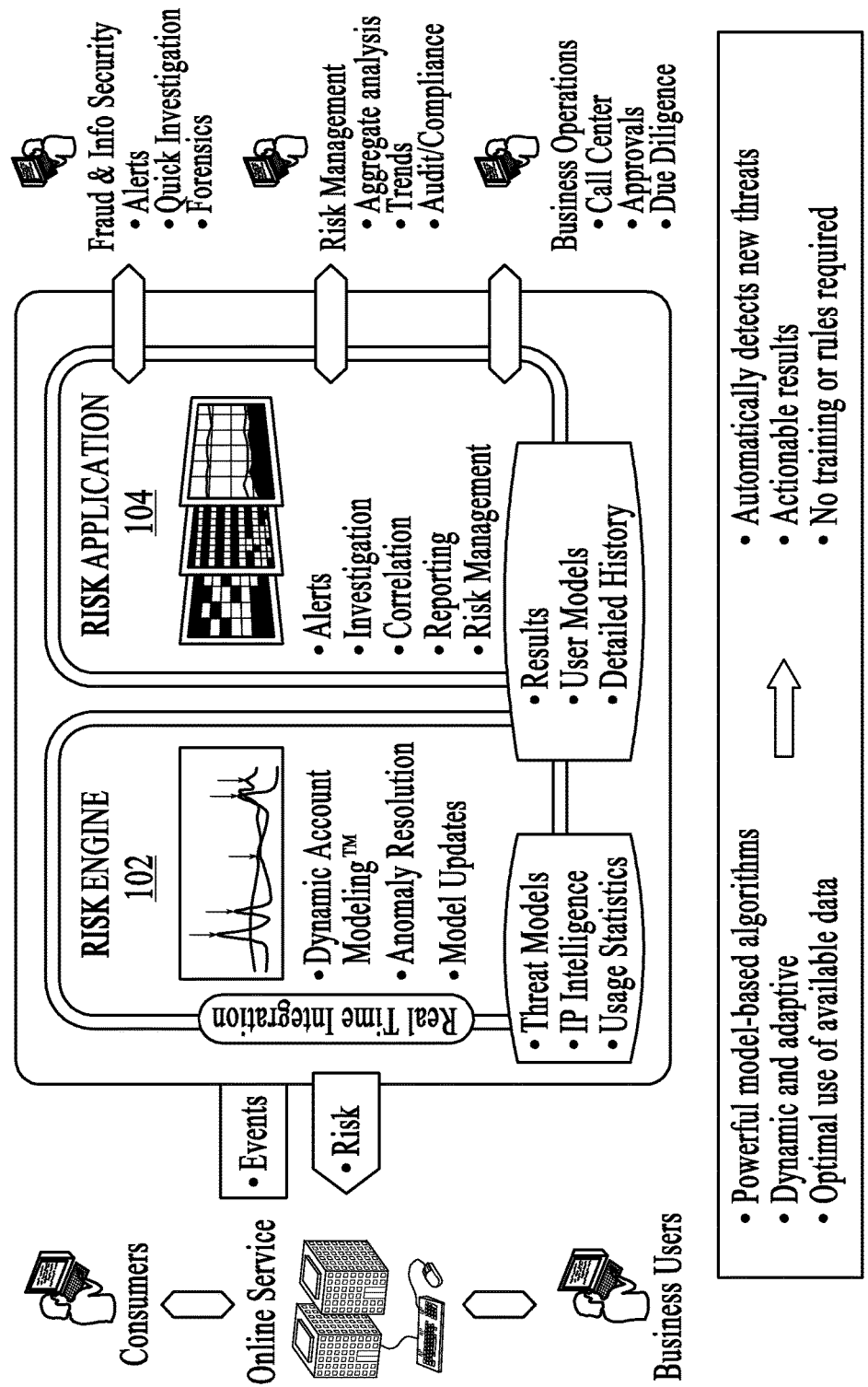
FIG. 1 is a block diagram of the Fraud Prevention System (FPS), under an embodiment.

FIG. 1 is a block diagram of the FPS 100, under an embodiment. The FPS 100 includes a Risk Engine 102 coupled to a Risk Application 104. The Risk Engine 102 includes or hosts applications, using predictive models of individual online customer behavior along with analytics that together detect fraud and minimize false positives. Unlike conventional approaches, the Risk Engine applications include real-time Dynamic Account Modeling that automatically detects new fraud attacks without requiring rules development or algorithm training. The Risk Application 104 features a visual analytic interface to aid investigation, resolution and risk monitoring. The visual analytic interface included in and/or coupled to the Risk Application 104 is also referred to herein as the analytical user interface (AUI). Going beyond simple alerts, the Risk Application 104 delivers analysts high-fidelity risk scores and extensive contextual information behind the risk score to support comprehensive analysis and investigation.

The Risk Engine 102 of an embodiment detects new and emerging fraud schemes using predictive models of individual online customer behavior and, as such, it differentiates normal user behavior from suspicious activity. The Risk Engine 102 may use fraud models based on known information about fraud threats when available, but is not dependent on knowing detailed fraud patterns or pre-defined fraud rules. To ease integration with the customer's online channel, the Risk Engine 102 features both a real-time API and file-based batch controller for wider integration and deployment options.

The Risk Engine 102 includes Dynamic Account Modeling, as described herein. The Dynamic Account Modeling, also referred to herein as "predictive modeling" or "modeling", uses predictive models of each individual online user's behavior. Because the Risk Engine 102 is not dependent on pre-defined fraud rules and automatically detects anomalous behavior, new threats are detected as they occur. Furthermore, the Risk Engine 102 easily handles real world situations such as changing user and fraudster behavior, the use of proxies, corporate firewalls, dynamic IP addresses, and upgrades to customer hardware and software. The advanced statistical models of the Risk Engine are based on probabilities that dynamically adjust to individual user behavior, recognizing that every user behaves differently and what might be unusual for one user may be normal for another.

The Risk Application 104 provides a visual analytic interface to aid investigation, resolution and risk monitoring. Components of the Risk Application 104 display detailed views of online account activity from customer sessions with fine-grained risk scoring, as described in detail herein. The interactive configuration of the Risk Application 104 enables use by any employee involved in fraud prevention, including fraud analysts, IT security personnel, risk management analysts, online channel analysts, or even customer-facing employees. The Risk Application 104 functions include, but are not limited to, alert management, investigation and forensics, process management, and performance measurement, each of which is described in detail below.

The alert management function of the Risk Application 104 includes highly accurate risk score alerts that use adjustable thresholds to pinpoint only the most suspicious activity, isolating compromised accounts. High fidelity scoring allows fraud teams to optimize their time and effort by ensuring the right investigative priorities. This intuitive, actionable information focuses anti-fraud efforts.

The investigation and forensics function of the Risk Application 104 provides visual tools to scrutinize suspicious events with sophisticated investigation tools. The application returns session-specific context and detailed customer history to aid investigation. It detects coordinated attacks, correlating activity across accounts. Other business operations can leverage detailed account histories and customer activity to aid in the risk assessment of offline transactions.

The process management function of the Risk Application 104 includes case management tools that allow investigators to track any incident, manage related workflows, and analyze fraud case histories on an individual or aggregate basis.

The performance measurement function of the Risk Application 104 measures and reports on the effectiveness of fraud controls trended over time, increasing the risk management organization's understanding of risk levels. Metrics track risk trends, aggregate analysis across accounts, and aid compliance directives with auditable results.

Figure 2A:
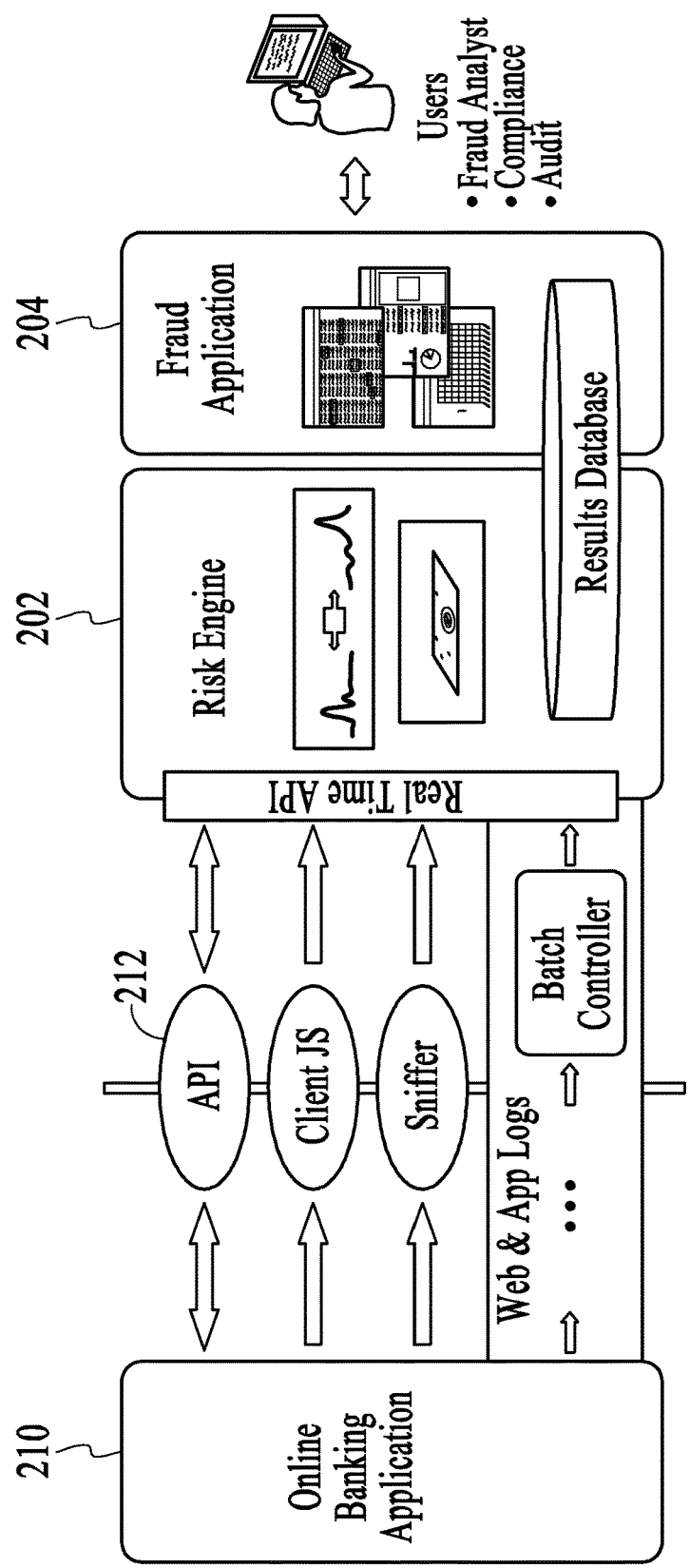
FIGS. 2A and 2B show a block diagram of FPS integration with an online banking application, under an embodiment.
Figure 2B:
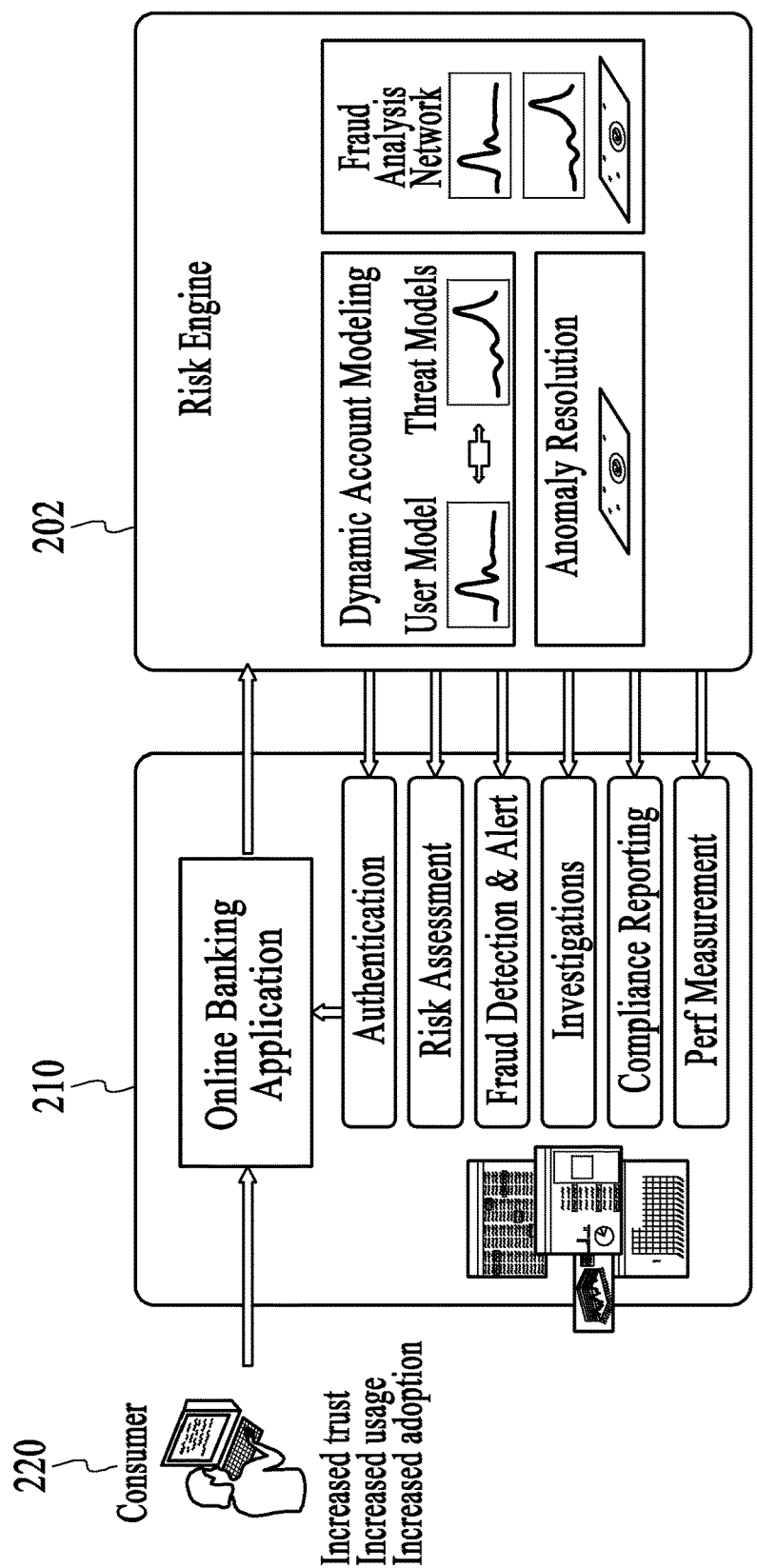

The FPS of an embodiment is used to prevent one or more of online fraud, off-line fraud, and multi-channel fraud. As one example, FIGS. 2A and 2B show a block diagram of FPS integration with an online banking application, under an embodiment. In this example, the Risk Engine 202 is coupled to the online banking application 210 using a real-time application programming interface (API) 212 and/or one or more applications (e.g., authentication, risk assessment, fraud detection and alert, investigations, compliance reporting, performance measurement, etc.) as appropriate to a configuration of the Risk Engine 202 and/or the online banking application 210. The FPS can be integrated with the online application 210 through a real time feed of event information or by processing log files that contain event information. As described above, the Risk Application 204 (labeled as the Fraud Application 204 in this example) functions to perform one or more of alert management, investigation and forensics, process management, and performance measurement, to name a few.

The user or "consumer" 220 in this example logs in to the online banking system 210 and uses the online banking system 210 to perform events (e.g., check account balance, view check images, transfer funds, etc.) in his/her account. The FPS comprises a risk engine 202 coupled to a risk application 204, as described herein. The risk engine 202 is a real-time event processor that receives data of user events or a set of events. The risk engine 202 also stores the user account model for the particular user. The risk engine 202 calculates a risk score using the event data and the user account model. The risk engine 202 uses the risk score and details of the observed event to update the user account model, and stores the updated user account model for use in evaluating the next subsequent set of event data (of a session) of the user. The risk engine 202 also transfers the risk score to the online banking application 210. The risk application 204 also provides alerts and allows authorized personnel to perform correlations, reporting, and investigations using the event data.

Figure 3:
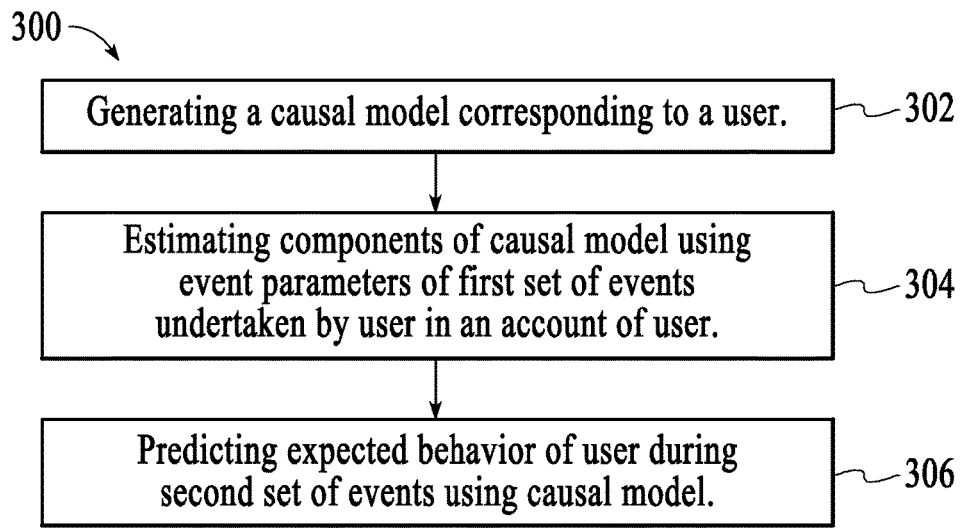
FIG. 3 is a flow diagram for a method of predicting expected behavior using the FPS, under an embodiment.

Regardless of physical system configuration, the FPS functions to detect and prevent fraud using behavior-based models that correspond to a particular user's behavior. As one example, FIG. 3 is a flow diagram for a method 300 of predicting expected behavior using the FPS, under an embodiment. Operations begin by dynamically generating 302 a causal model corresponding to a user. Components of the causal model are estimated 304 using event parameters of a first set of events undertaken by the user in an account of the user. Expected behavior of the user is predicted 306 during a second set of events using the causal model.

The FPS is configured and functions to prevent online fraud, off-line fraud, and multi-channel fraud. More specifically, the online fraud and off-line fraud includes account takeover fraud, which is when someone steals the account access credentials (username, password, PIN, etc.) of a user or account owner and then masquerades as that user and accesses account. Multi-channel fraud includes all channels through which a user interacts with his/her bank or accesses bank accounts (e.g., ATM, call center, live branch visit, etc.). An example of multi-channel fraud is when someone steals account access credentials, accesses the account online and changes profile information or gets information about the account owner (e.g., account balances, account numbers, signature from check images, etc.), and then commits fraud via other channels (check fraud by forging signature) using information gained via account access. This is an example where the financial fraud occurs off-line, but it started online with fraudster accessing user's account using stolen access credentials.

An event as used herein comprises an online event, an offline event, and/or a multiple-channel event. Consequently, the first set of events comprises at least one of online events, offline events, and multiple channel events. The second set of events comprises at least one of online events, offline events, and multiple-channel events. The online events are events that can be undertaken via electronic access to the account.

For online events, an online event comprises one or more of a login event and an activity event. A set of events comprises a session, and a session is a sequence of related events. The sequence of related online events comprises a session login event and a termination event, and can include one or more activity events.

For offline events, an offline event comprises one or more of an account access event and an activity event. A set of events comprises a session, and a session is a sequence of related events. The sequence of related online events comprises an account access event and a termination event, and can include one or more activity events.

Multi-channel events include online and offline events. Therefore, multi-channel events include one or more of a login event, an account access event, and an activity event.

Figure 4:
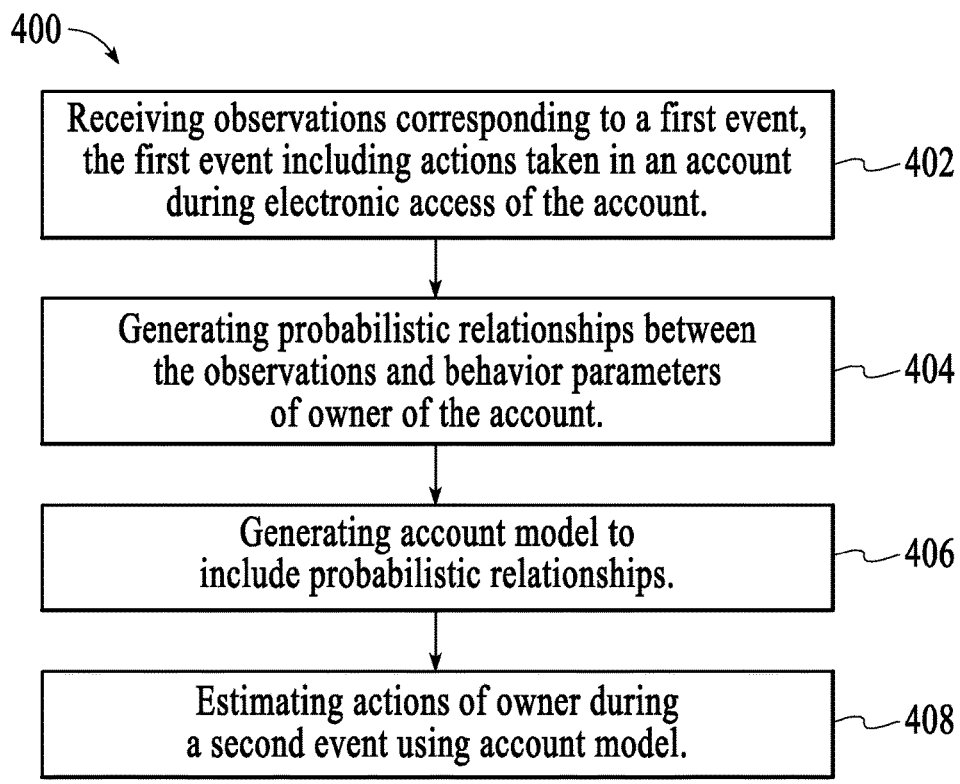
FIG. 4 is a flow diagram for a method of estimating actions of an account owner using the FPS, under an embodiment.

As another example of FPS operation, FIG. 4 is a flow diagram for a method 400 of predicting expected behavior of an account owner using the FPS, under an embodiment. Operations begin by receiving 402 observations corresponding to a first event. The first event of an embodiment includes actions taken in an account during electronic access of the account. Probabilistic relationships are generated 404 between the observations and derived behavior parameters of an owner of the account. Operations continue by generating 406 an account model to include the probabilistic relationships, and estimating 408 actions of the owner during a second event using the account model.

Figure 5:
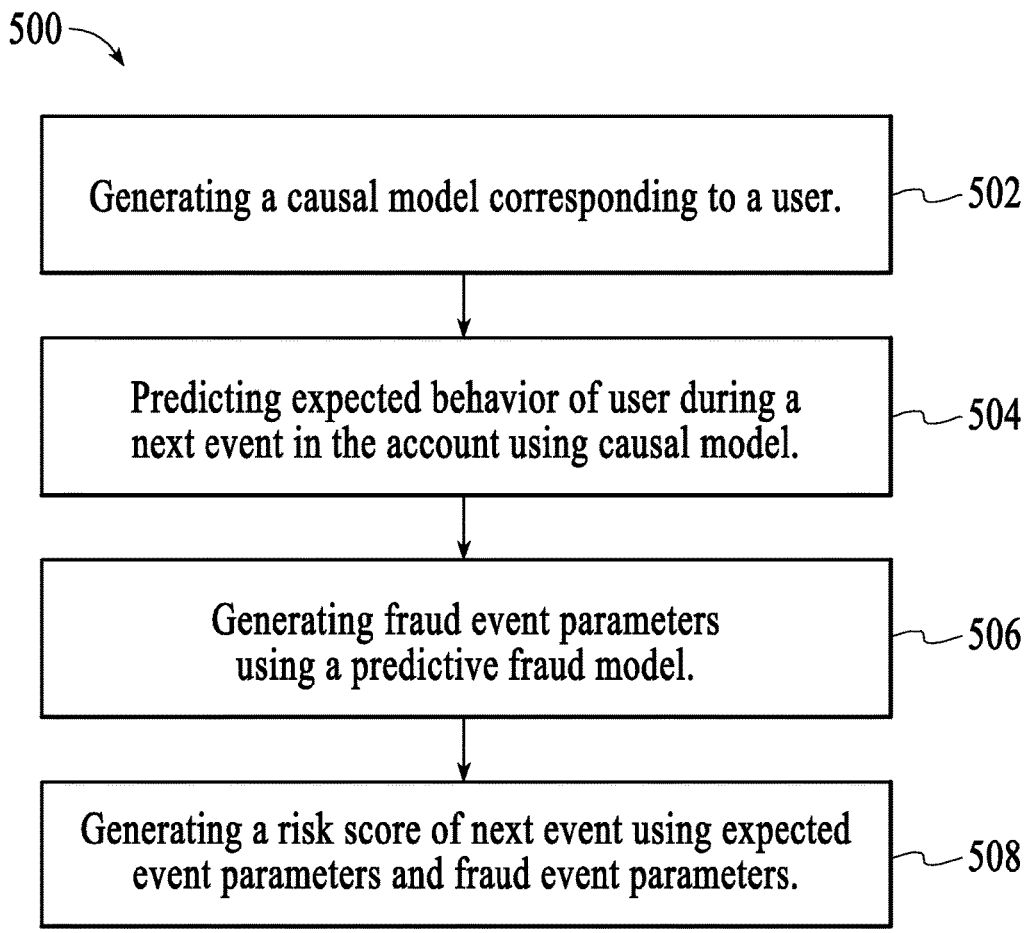
FIG. 5 is a flow diagram for a method of determining the relative likelihood a future event is performed by the user versus the fraudster using the FPS, under an embodiment.

As yet another example of FPS operation, FIG. 5 is a flow diagram for a method 500 of determining the relative likelihood a future event is performed by the user versus the fraudster using the FPS, under an embodiment. Operations begin by automatically generating 502 a causal model corresponding to a user. Generating the causal model comprises estimating components of the causal model using event parameters of a previous event undertaken by the user in an account of the user. Operations continue by predicting expected behavior 504 of the user during a next event in the account using the causal model. Predicting the expected behavior of the user includes generating expected event parameters of the next event. Operations continue by generating fraud event parameters 506 using a predictive fraud model. Generating the fraud event parameters assumes a fraudster is conducting the next event, the fraudster being any person other than the user. Operations continue by generating a risk score 508 of the next event using the expected event parameters and the fraud event parameters. The risk score indicates the relative likelihood the future event is performed by the user versus the fraudster.

Figure 6:
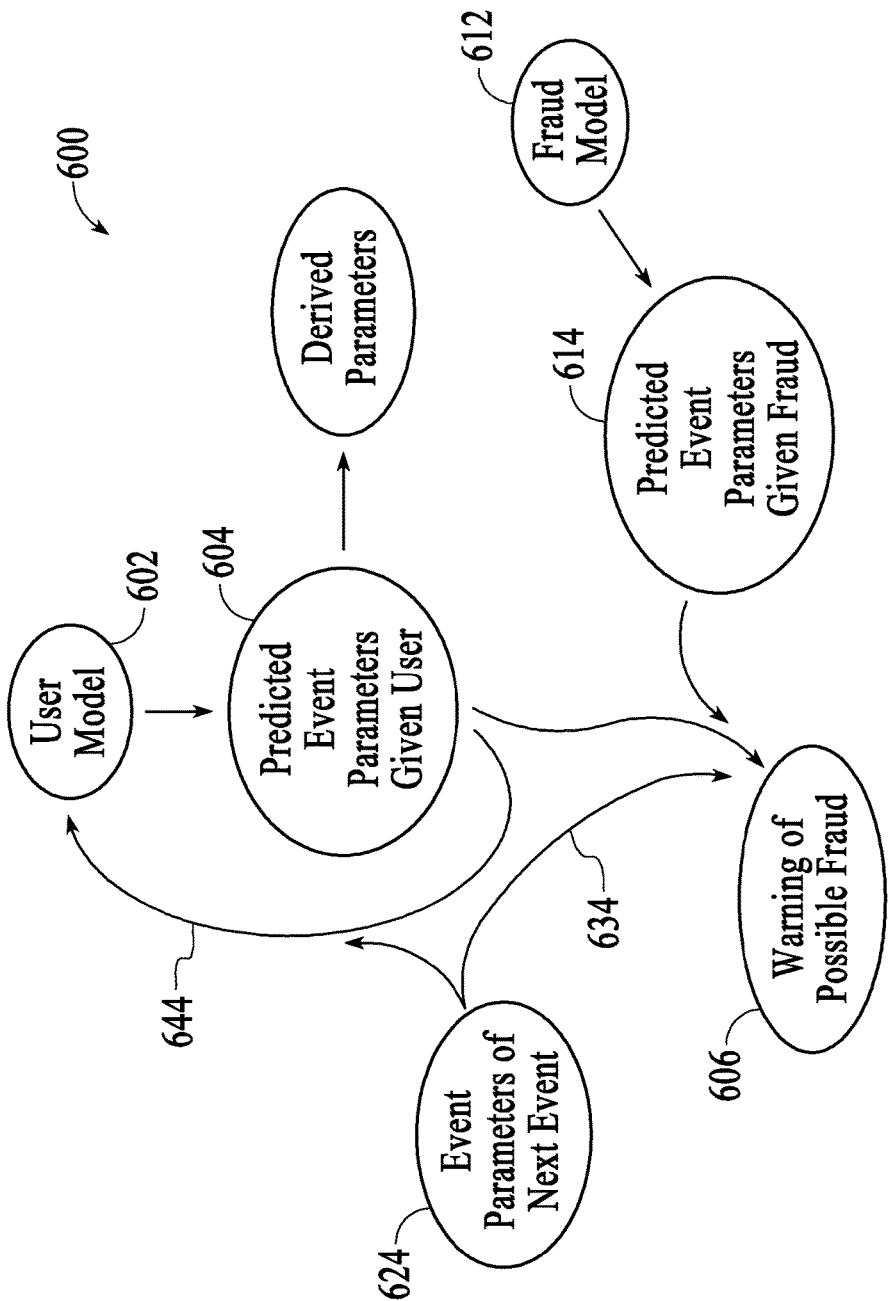
FIG. 6 is a flow diagram for using the FPS to generate warnings of possible fraudulent activity, under an embodiment.

FIG. 6 is a flow diagram for using the FPS to generate warnings 600 of possible fraudulent activity, under an embodiment. Operations begin by generating a predictive user model 602 corresponding to a user. The predictive user model 602 includes numerous probability distributions representing event parameters observed during a first event in an account of the user. Predicted event parameters 604 are generated using the predictive user model 602. The predicted event parameters 604 are expected to be observed during a second event 624 in the account, where the second event follows the first event in time. Generation of the predicted event parameters 604 includes generating a first set of predicted probability distributions that represent the predicted event parameters under an assumption that the user is conducting the second set of online events.

A second set of predicted probability distributions is generated using a predictive fraud model 612. The second set of predicted probability distributions represents expected fraud event parameters 614 and assumes a fraudster is conducting the second set of online events, where the fraudster is any person other than the user. A comparison 634 is made between actual event parameters of the second event 624 to the predicted event parameters 604 and 614 during the second event, and a warning 606 generated when the actual event parameters 624 appear to be initiated by a person other than the user. The warning 606 comprises generating a risk score using information of the predicted event parameters 604, but the embodiment is not so limited. The user model 602 is updated 644 using information of the event parameters of the second event 624.

Conventional fraud detection is based on pre-specified rules, identified fraud patterns, or taking known fraud and processing it using supervised learning techniques, as described above. Conventional fraud detection is ineffective, in online fraud for example, because online fraud is very dynamic and technology development for conducting fraud is very dynamic and constantly changing. Also, activity associated with online fraud often does not look suspicious (e.g., viewing account information, check images, etc.). This makes it very difficult to craft rules to detect fraud because fraud can be very subtle and is constantly changing.

As opposed to attempting to determine exactly what fraud looks like or to precisely model fraud and then compare this model to a normal (average) user, embodiments of the FPS described herein instead analyze each individual user and the exact behavior of that user. This is more effective because the behavior of each user is a very small subset of the behavior included in a modeling of average behavior of many different users. Thus, the particular online banking activities or behavior typically observed in a single user (e.g., login from Palo Alto, Calif., login using a particular computer, login using a particular internet service provider (ISP), perform same types of activities (e.g., look at account balance, view check images, etc.)) can be used to establish an online behavior model of the user which is very specific and unique to each particular user. This makes fraud easier to detect because the fraudster does not know how the user behaves online so it is very difficult for the fraudster to appear like the account owner. Notably, what may be normal for an "average" user may be very unusual for a specific user. Of equal importance, even behavior that might be considered "unusual" for the "average" user may be very normal for a particular individual. Both of these cases are therefore very distinctive and useful in distinguishing between legitimate and fraudulent activity.

The FPS uses a predictive model of each individual user to detect online fraud. This real-time or dynamic predictive modeling, also referred to herein as Dynamic Account Modeling, is an application running on or under the Risk Engine of an embodiment. Exact behavior of the fraudster becomes less important using this approach because the analysis focuses more on the types of things users generally do instead of detecting specific known fraud patterns. Unlike a system in which fraud data of previous fraud activities is used to train a system or to generate rules, the FPS does not require rules or training. Thus, the FPS can detect new types of fraud even though this new fraud may not have been seen before because it is based on the user's online behavior. This results in high detection rates and low false alarm rates.

Generally, the FPS uses two types of models in preventing fraud. The FPS models behavior of a specific user through a predictive user model (PUM) that is used to calculate the probability of an observed event given the specific user. The FPS models behavior of fraudsters through a predictive fraud model (PFM) that is used to calculate the probability of an observed event given a fraudster. The probabilities are then used to calculate a risk score for a next occurrence of the event to which the probabilities correspond.

The models of the FPS described herein are supported using two hypotheses for each event: a first hypothesis assumes the observed event is by the real user associated with the specific account, and the second hypothesis assumes that the observed event is performed by a fraudster. An event includes, for example, an account login, and/or any particular activity taken in the account while logged into the account. Each event includes a set of parameters including, but not limited to, IP address and identification data of the computer used during the event to name a few.

The FPS generates and maintains the PUM, a specific causal model for each user, under the first hypothesis, and then uses the PUM to predict the expected actions of that individual user to which the model corresponds. The FPS generates the PUM for a user by estimating a probability function of a user based on previous user activity and also a normal expectation of how users behave. The FPS starts with a generic "normal" user activity model when no prior activity information is available for a user. As activity data is gathered for the user from events or activities taken by the user, parameters of the user model are estimated over time based on gathered observations of the user so that, at any point in time, an accurate PUM is available for a user. The PUM is thus developed recursively over time. User events are scored as they happen, and this provides a risk score for an event. Event parameters are then used to update the user model, and the updated user model is used to determine a risk score for the next subsequent user event.

The PUM is built based on observed behavior of the user along with a statistical analysis of users in general. The structure of the PUM is pre-formulated so that there is no requirement to discover the structure of the model but rather to estimate unknown parameters of the model. The PUM development uses a causal model, represented or formulated in an embodiment as a Bayesian network, that relates (probabilities of) real-world derived parameters (e.g., location of the user (country, state, city), type of computer being used for the event, activities detected during an online session) to observable parameters of the session (e.g., IP address, HTTP header information, page views, etc.). The IP address provides an estimate of location information like country, state, city, network block, and internet service provider. The HTTP header provides information of the operating system (OS), user agent string, referrer string, and browser type of a computer used for an event. Therefore, the behavior of each user can be modeled using probability distributions of observable parameters of sessions and events of the user. The Bayesian network is decomposed into individual parameters and the relationships between the parameters. Distributions and conditional distributions are based on prior, observed data, "new mode" probability models, etc.

The user is related to the actual observable parameters (including time, IP address, browser, OS, etc.) corresponding to an event. The FPS uses a causal model based on user's observed behavior to predict future behavior. The PUM is therefore the structure formed by the real world parameters used or selected, the observed event parameters and the relationships between the real world parameters and observed event parameters.

The use of the causal model for specific users allows the FPS to detect fraudulent activity and events without the need for specific known rules, patterns, and/or indicators and without the need for training data of known fraud cases.

Therefore, the FPS can detect all fraud, both known and unknown, including fraudulent activity that has never before been seen.

A PFM is generated under the second hypothesis of an embodiment. The PFM generally uses all other session or event data of all other online account holders who are not the user. This data is used to generate a probability of users at large. These probabilities can then be adjusted using known information of prolific fraudsters (e.g., that the rate of fraud coming from Nigeria is ten times higher than other (low-risk) countries), but this is not necessary. This is different from conventional fraud systems, which rely on information about fraud through the use of new and/or additional rules, indicators or patterns. In contrast, the FPS uses at large online activity to develop the PFM, a causal model that represents fraudsters (everyone not a particular account owner), and then adjusts the probabilities or expectations of the PFM based on how fraudsters behave. Thus the FPS is unique in how it incorporates information of fraudulent activities.

The models of an embodiment include the PUM, which is a joint probability distribution, as described above. The PUM is a causal model. The net effect or result of the PUM is a probability of the observed parameters or event given the specific user to which the PUM corresponds. The PUM is therefore a predicted probability distribution of event parameters for the next event given the specific user to which the PUM corresponds.

The FPS models also include the PFM, as described above, which is a joint probability distribution. The PFM is also a causal model. The net effect of the PFM is a probability of the observed parameters or event given a fraudster. The PFM is therefore a predicted probability distribution of event parameters for the next event given fraud.

A risk score is calculated for a next event using the results of the PUM and PFM. The next event is an event or action taken in a user's account that appears to be initiated or taken by the account owner. The risk score of the next event is determined or calculated by taking the probability of the observed event given fraud, as determined using the PFM, and dividing it by the probability of the observed event given the specific user, as determined using the PUM. The risk score can be used to generate alerts or warnings for the next event.

The FPS uses recursive model building to generate the PUM. The PUM does not represent the full detail of every event ever seen in the account of the user but, instead, it includes individual probability distributions for each of a number of particular parameters of one or more observed events. Each probability distribution of an observed parameter is a statistical distribution for the parameter over the observed events corresponding to the account. The individual probability distributions for the parameters are combined to form a joint probability distribution that is the PUM.

Generally, the PUM is generated by collecting event data in the form of observed parameters and, after each event, the PUM for the user to whom the events correspond is updated based on the observed parameters. The PUM then allows for propagation of the distribution of observed event parameters into a distribution of behavior event parameters, where the propagation includes the distribution of the observed parameters plus the prior model.

An example of model use begins with someone, either a user or fraudster, initiating an observed event. An observed event includes, for example, someone logging in to the user's account and/or any activity taken during an online session (e.g., checking account balance, transferring funds between accounts, viewing account information, etc.). The observed event may or may not be an online event. Each event includes or corresponds to one or more event parameters. Event parameters are directly observable parameters, or raw data that can be measured or observed, of an event. Examples of event parameters include, but are not limited to, network information that includes parameters of the network by which an online event is occurring (e.g., IP address, etc.) (country, state, city are derived parameters derived from network information; this is implied information in contrast to actual observed data of an event), user agent string (OS and browser of device or computer used for the event are derived parameters derived from user agent string; this is implied information in contrast to actual observed data of an event), and event or session time (timestamp), to name a few.

The models (e.g., PUM and PFM) of an embodiment are used to predict the actual observed event parameters for the next event given the model of the user's behavior during past events. Derived parameters, which are not directly observable, are then derived or propagated from the PUM and the observable parameters. Examples of derived parameters include, but are not limited to, geographic location (e.g., country, state, city, etc.) of user at time of event, device being used for event (e.g., device type/model, device OS, device browser, software applications, etc.), internet service provider (ISP), and user's local time of day of event, etc. The causal model of an embodiment includes probability relationships between derived parameters and event (observable) parameters, and probability relationships between different derived parameters. An example of relationships between parameters can be that the country of the user (event parameter) can relate to the ISP (derived parameter), and the ISP can relate to a particular set of IP addresses (event parameter).

The causal model of an embodiment is represented as a Bayesian network (BN). The BN of an embodiment uses or includes conditional probability distributions to model or represent the relationships between parameters (relationship between different derived parameters, relationship between event parameters and derived parameters, etc.). The BN, as embodied in the PUM, is or represents the distribution of the derived parameters, the distribution of observed parameters and the relationships between the observed and derived parameters. The result output from the PUM is a predicted distribution of expected event parameters of a next event. The distribution of the expected event parameters is used to calculate the risk score. The PUM is generated as described below.

The PUM is used to predict the event parameters of the next event. The predicted event parameters include the predicted probability distribution of what might be observed during the next event. The PUM therefore generates the predicted distribution of the event parameters for the next event. The next event is then observed and information of the observed event parameters is collected or received. Given the observed event parameter values (e.g., actual IP address), and the predicted probability distribution of all possible IP addresses that might be used (from the PUM, probability of the actual IP address given the user), the result is the probability of a specific observed event parameter (e.g., IP address) given the PUM. This is performed across all parameters.

The causal model of an embodiment therefore generates the likelihood of observing the observed parameter values given the current PUM (i.e., predicted distribution as defined by the PUM), and generates the likelihood of observing the observed parameter values given the current PFM (i.e., predicted distribution as defined by the PFM). The risk score is then calculated using these results, as described above.

As described herein, the PUM is generated by collecting event data in the form of observed parameters and, after each event, the PUM for the user to whom the events correspond is updated based on the observed parameters. The PUM then allows for propagation of the distribution of observed events into a distribution of behavior events, where the propagation includes the distribution of the observed parameters plus the prior model.

The update process updates the distribution of one or more observed parameters in the PUM to produce an updated PUM. The updated PUM therefore includes an updated expectation of one or more observed parameters in the form of an updated probability distribution relating to specific observed parameters. As an example, because a particular parameter (e.g., IP address (observed) in the US (location, derived parameter)) has been observed being used by the user during an event, this information is propagated back into the PUM to update the corresponding distribution so that, during the next subsequent event, there is a higher expectation that the same or similar parameter (IP address in the US) will be seen in the next event.

The model is updated periodically using actual observed event parameters since the last update of the model. The joint probability distribution of an embodiment is updated by updating the probability distributions for each observed parameter included in the model. The model update process of an embodiment is recursive and takes into account the last observed event, the previous user model (i.e., PUM), and the prior user model to name a few. The previous user model includes the PUM that was current for as of the last or most recent observed event. The prior user model includes the predicted probability distribution (i.e., PUM) before any events have been observed.

The model update process includes two alternatives. In a first embodiment of the update process, data of the current observed event is used to update the previous user model, and the prior user model is considered to be embedded in the previous user model and thus updated as part of the recursive process that updates the prior user model in response to each occurrence of an observed event.

In a second embodiment of the update process, the update process maintains an observed frequency distribution for each observed event parameter. Consequently, instead of updating the previous user model, each event parameter probability distribution is updated using data of the current observed event. The updated observed frequency distribution for each event parameter is then integrated with the prior user model to generate the updated PUM.

The probability distributions included in the prior model can initially be adjusted, prior to receiving any observed event data of the user, using general statistical information about users at large and/or data of the specific user collected from the user or from the user's account profile. For example, the probability distributions can be adjusted using uniform probability distributions. The probability distributions can also be adjusted using probability data corresponding to residence information of the user (e.g., US resident, and 1% of US residents use particular block of IP addresses). Furthermore, the probability distributions can be adjusted using financial institution data of the user (e.g., user is XYZ Bank customer, and 95% of XYZ Bank customers are in the US).

The fraud model (i.e., PFM) of an embodiment is similar to the PUM in that it is a predictive distribution based on observed parameters and derived parameters of events. This is in contrast to conventional rule-based systems that use specific indicators (rules) relating to fraud. The rules can be weighted, however, a weighting is not a probability distribution so these systems have absolutely nothing in common with the embodiments described herein.

Figure 7:
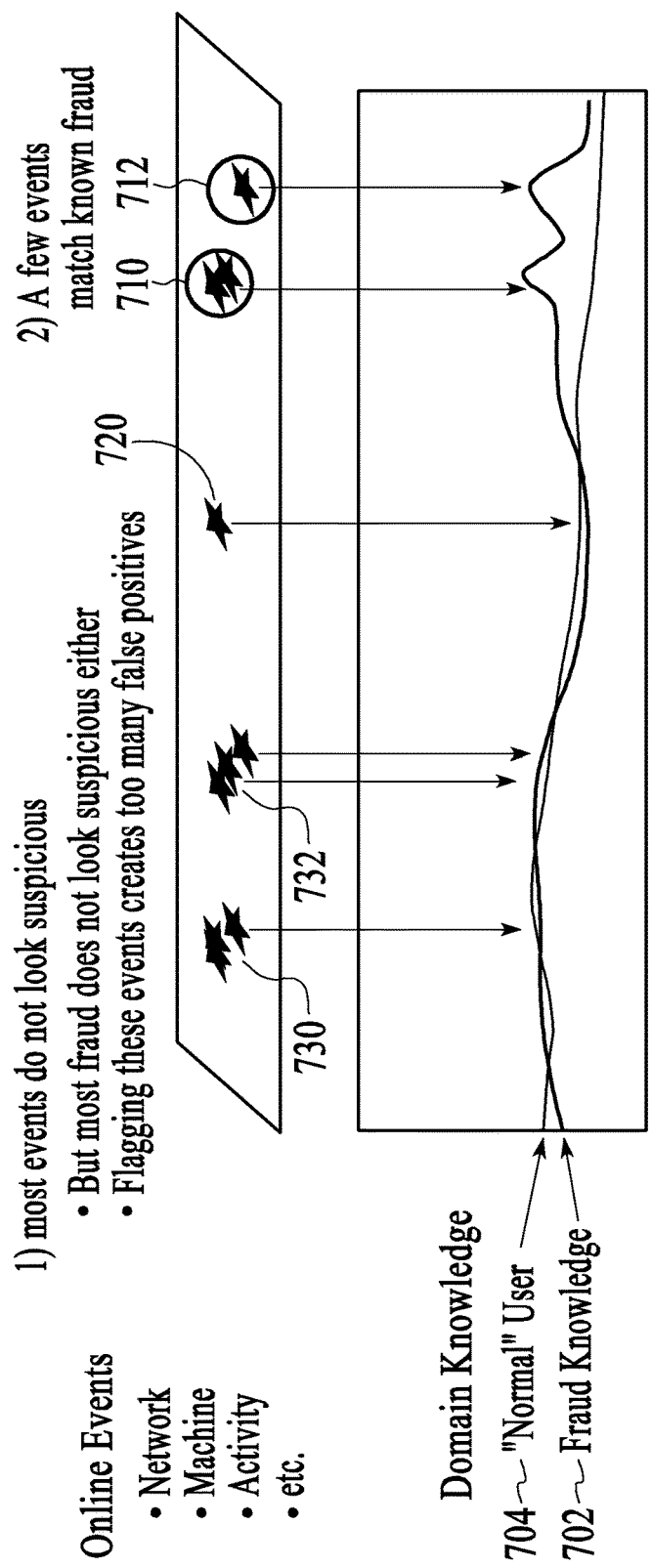
FIG. 7 shows the use of conventional fraud techniques ("fraud knowledge") applied to activities of a user ("normal user") under the prior art.
Figure 8:
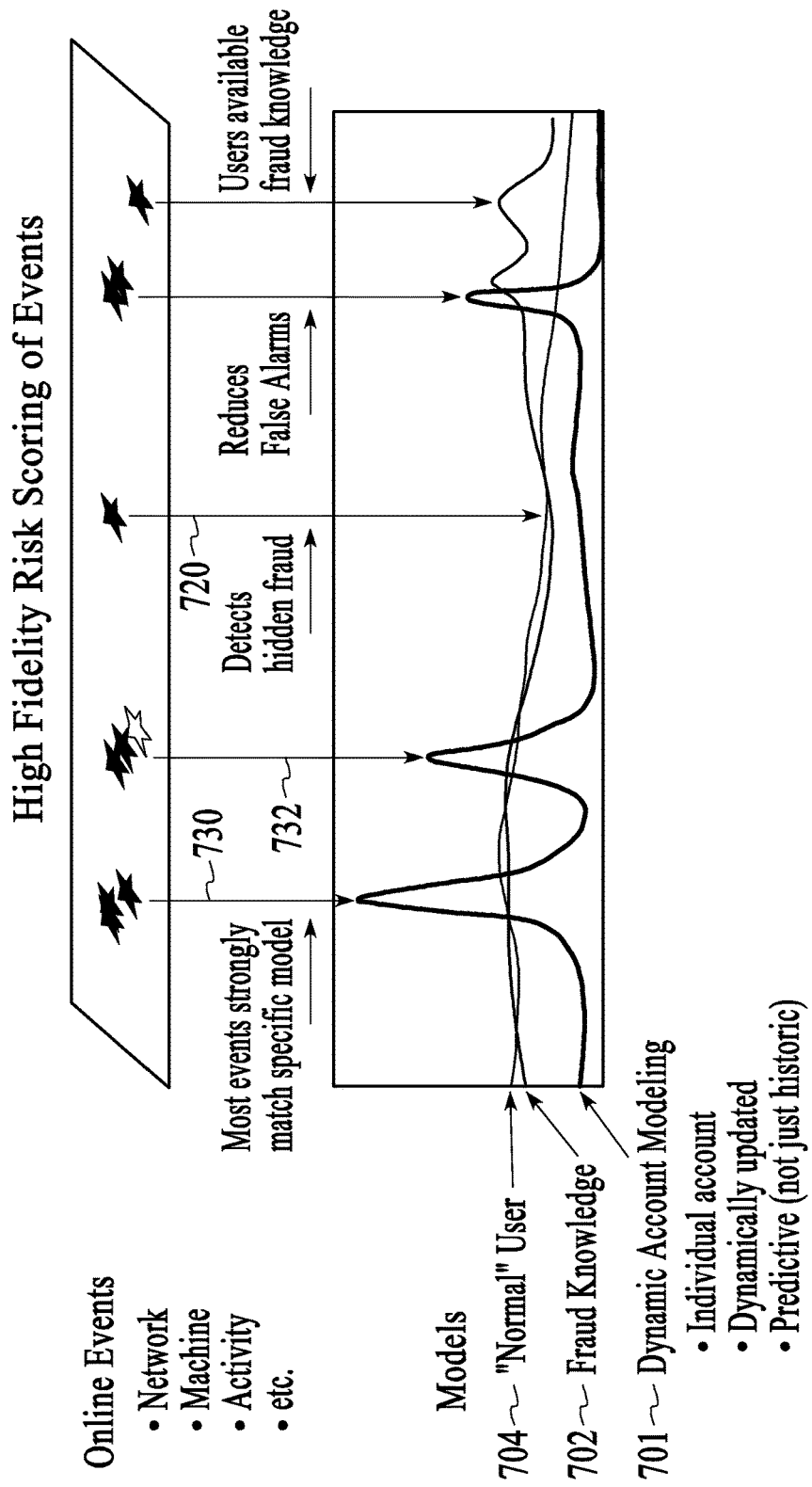
FIG. 8 shows the use of dynamic account modeling applied to activities of a user, under an embodiment.

FIG. 7 shows the difficulties and limitations of using conventional fraud techniques 702 (fraud knowledge 702) applied to activities of a user 704 (normal user 704) under the prior art. These conventional techniques, as described above, can detect some known fraud events 710 and 712, but can allow real fraud events 720 to go undetected while generating many false positives for events 730 and 732 that are not fraudulent activity. In contrast, FIG. 8 shows the use of dynamic account modeling 701 applied to activities of a user, under an embodiment. The dynamic account modeling 701 applies a predictive model 701 of the specific user against event activities of the user's account and, in so doing, detects previously hidden fraud 720 and reduces false alarms for events 730 and 732 that are not fraudulent activity.

The FPS of an embodiment includes a graphical interface for a user's account that shows account activity along with corresponding parametric data. The graphical interface is also referred to herein as an analytical user interface (AUI). The AUI displays for any event in the account at least one of the risk score and the event parameters, to name a few functions. The AUI comprises a horizontal axis representing time and a vertical axis representing the event parameters. The event parameters, as described above, include one or more of Internet Protocol (IP) data and Hypertext Transfer Protocol (HTTP) data. The IP data includes one or more of an IP address, IP address country, IP address city, IP network block, and internet service provider supporting an event. The HTTP data includes one or more of data of an operating system, a user agent string, a referrer string, and internet browser of a computer used for an event.

The AUI includes numerous columns, and each column represents at lease one event conducted in the account. The columns of an embodiment are arranged according to date. The AUI also includes numerous rows, and a set of rows represent event parameters of the events. Considering the rows and columns, the AUI includes numerous intersection regions, and each intersection region is defined by an intersection of a row and a column. The intersection region corresponds to an event parameter of at least one event. Furthermore, the intersection region includes color coding relating the event parameter to a corresponding probability of the account model. The color coding represents a relative likelihood ratio that the event parameter corresponds to the user.

The AUI also includes a risk row representing risk of the events. Each intersection region defined by the intersection of the risk row with a column corresponds to the risk score of at least one event corresponding to the column. The intersection region includes color coding relating the risk score to at least one event. The color coding represents a relative likelihood ratio that the user conducted the event.

Figure 9:
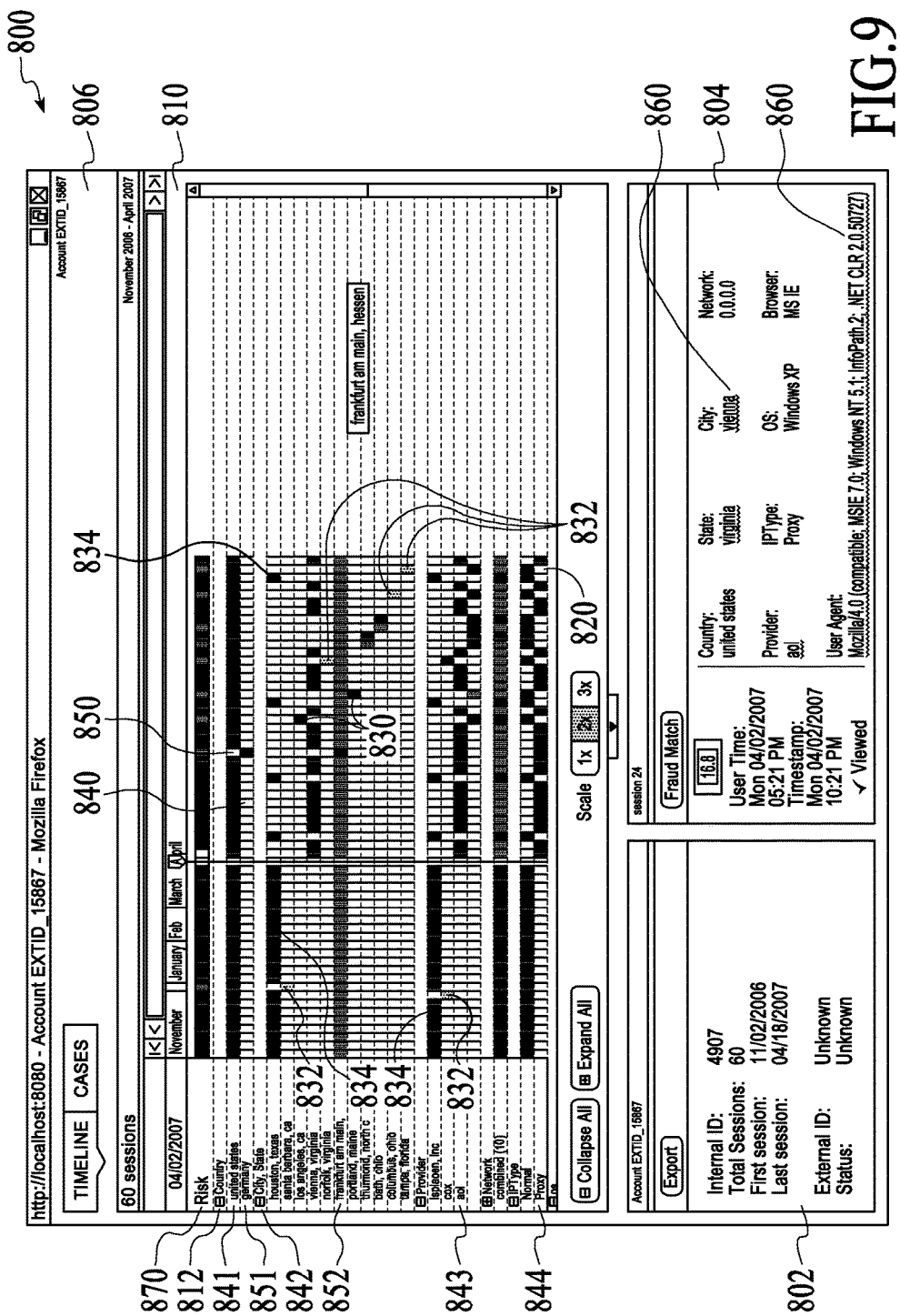
FIG. 9 is an example screen of the FPS graphical interface (AUI), under an embodiment.

FIG. 9 is an example screen 800 of the AUI, under an embodiment. One type of AUI screen includes one or more information portions 802-804 along with a graph portion 806. The graph portion 806 of the AUI includes a horizontal axis 810 and a vertical axis 812. The horizontal axis 810 represents time (e.g., date). The horizontal or time axis 810 can be modeled as weekdays and weekends, and each day can be subdivided by morning, afternoon, evening, for example, but the embodiment is not so limited. The vertical axis 812 of the AUI represents categories of parameters (e.g., country, city, state, internet service provider, network, IP type, etc.) along with all different parameter values historically observed for the user's activity in a category. Each column 820 of the AUI represents a user login event or user session organized by date. The AUI includes a color-coded bar 870 in a region of the display, and the color-coded bar is an overall risk column for the user to whom the display corresponds.

The AUI displays a color coding (e.g., red 830, yellow 832, green 834, etc.) representing thresholds corresponding to the component risk scores of each parameter of an event. The FPS models behavior, as described above, based on the fact that as more data is received tying a particular user to a particular parameter value (e.g., 98% of logins by Jane Doe are in US), it determines a probability that this particular parameter will be different for the particular user (e.g., what is the probability that Jane Doe logs in from Mexico). The predicted probability distribution of the model parameters become much tighter or narrower as more event data is collected from the user, and the colors displayed on the AUI relate to each parameter of the event and the relative model probabilities (fraud versus user) corresponding to that parameter.

For example, for event 840, the parameters for country (United States 841), City, State (Vienna, Va. 842), provider (AOL 843), and IP Type (proxy 844) can be coded green to show a high probability under the dynamic account modeling that the account owner is initiating the event. In contrast, for event 840 the parameters for country (Germany 851) and City, State (Frankfurt 852) can be coded red for an event to show a low probability under the dynamic account modeling that the account owner is initiating the event, while the parameters for provider (AOL 843) and IP Type (proxy 844) can be coded green for the same event to show a high probability under the dynamic account modeling that the account owner is initiating the event.

The information portions 802-804 of the AUI can be used to display a variety of parameters or data as appropriate to the FPS and any integrated application. For example, the AUI can display underlined parameter values 860 having an underline color (e.g., red, yellow, green, etc.) that correlates with the amount of risk associated with that particular parameter (e.g., Virginia (state) and Vienna (City) have a red underlining to indicate high probability of fraudster activity).

The adaptive nature of the FPS model is especially useful in situations where, for example, a user may travel frequently so that the parameters are frequently changing. The FPS dynamically adapts to this behavior so that the behavior is not consistently flagged as fraud, as would happen under conventional rule-based systems. Therefore, the model adapts over time using data that shows particular behavior (e.g., user in Denver) has been observed from a user (e.g., user logs in from Denver), so what is the probability that the same behavior (e.g., user logs in from Denver in a subsequent event) will be observed in the future from the same user.

Figure 10:
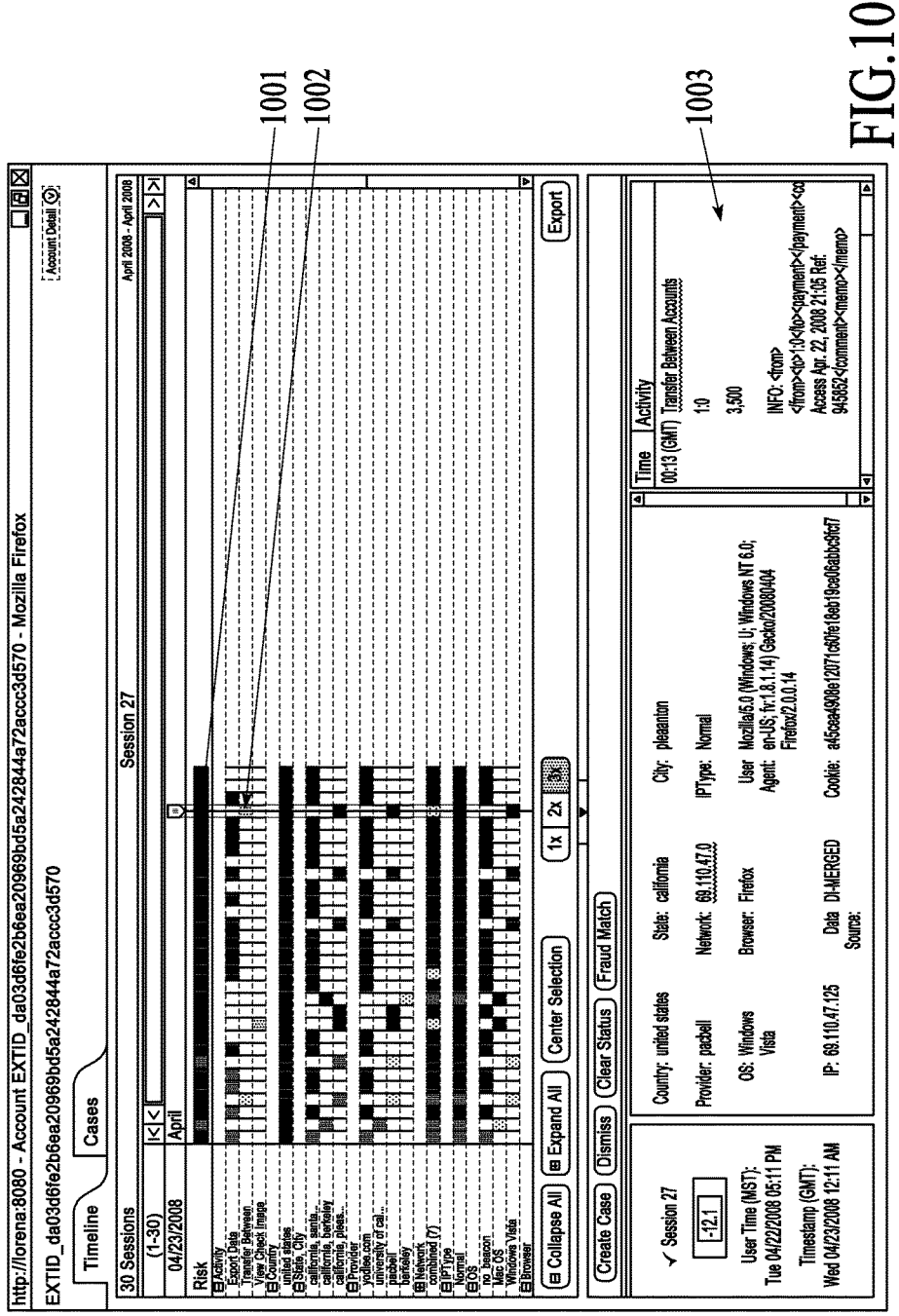
FIG. 10 shows a variation of the example screen (FIG. 9) of the FPS graphical interface (AUI), under an embodiment.

FIG. 10 shows a variation of the example screen (FIG. 9) of the AUI, under an embodiment. Referring to this example screen, information from all related activity events from the same online session is shown on the timeline within the same column 1001 that represents the session. Summary information about what types of activities occurred in each session are indicated by a color coded bar 1002. The color, Red, Yellow or Green indicates the associated risk for the activities of that type for that particular session. On the same screen, detailed information about each activity within the selected session can also be shown in one or more information boxes or regions 1003 of the AUI.

If suspected fraudulent activity is indicated by the FPS, the Risk Application allows an analyst to perform a fraud match. The fraud match of an embodiment allows the analyst to search for other sessions across all institutional accounts having similar characteristics (e.g., sessions originating from Mexico, sessions with provider AOL, etc.) in an attempt to identify other instances of fraud.

The FPS fraud match enables a comparison between data of one session and all other data of an institution in order to identify all sessions having one or more similar parameters. Thus, institutions can use the fraud match function to identify other suspicious sessions with parameters that are similar or the same (e.g., ISP, country, machine, etc.) as a suspected fraud attack.

The FPS therefore can provide a risk assessment based on the overall activity of all users within an institution over a specified period of time (e.g., day, multiple days, week, etc.) in order to help the institution determine if it is under attack. This is a fundamental difference in the FPS when compared to conventional systems, because the FPS takes a risk management approach versus the approach of conventional systems, which is to try and stop all fraud.

All features of the FPS work together to allow a financial institution, for example, to understand fraud instead of attempting to make a prefect binary decision on whether to block a transaction as fraud, which is futile. The FPS recognizes that the importance is to understand fraud so that fraud can be recognized earlier using observable parameters (related or translated to derived parameters) and losses minimized versus trying to block any suspicious activity, which if done imperfectly only leads to customer dissatisfaction and inconvenience when non-fraudulent transactions are flagged as fraudulent based on conventional rules-based approaches. From a risk management perspective, the fraud match application allows an institution to look at all data collected over time according to one or a defined set of criteria in order to see an overall percentage of fraudulent activity related to the criteria. This allows smarter decisions to be made, for example, because knowing that a very high percentage of traffic with a certain ISP is not fraudulent might prevent a decision to block all traffic from the ISP based on a high occurrence of fraudulent activity in a recent period of time.

The FPS components described herein (e.g., Risk Engine, Risk Application, Dynamic Account Models, etc.) can be components of a single system, multiple systems, and/or geographically separate systems. The FPS components can also be subcomponents or subsystems of a single system, multiple systems, and/or geographically separate systems. The FPS components can be coupled to one or more other components (not shown) of a host system or a system coupled to the host system.

The FPS of an embodiment includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers and other processor-based devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components of the FPS, and/or provided by some combination of algorithms. The FPS methods described herein can be implemented in one or more of software algorithm(s), programs, firmware, hardware, components, circuitry, in any combination.

The FPS components can be located together or in separate locations. Communication paths couple the FPS components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Following is a description of a fraud analysis example generated by the FPS using actual data of an account owner of a financial institution. The example is presented only to help describe operation of the FPS and are not intended to limit embodiments of the FPS to only the scope of these examples.

Fraud Analysis Example

Figure 11:
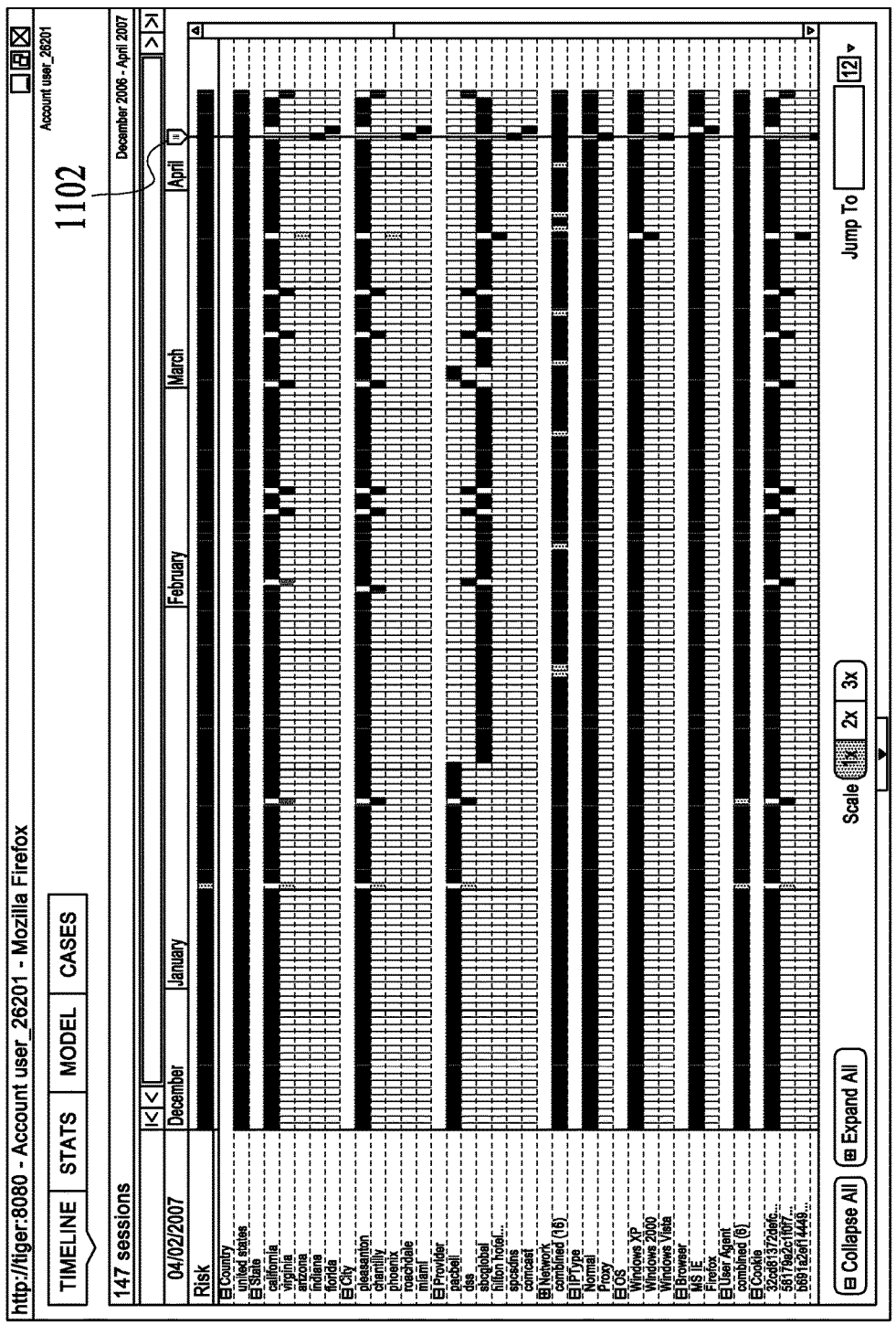
FIG. 11 is an example AUI showing normal use behavior for a user, under an embodiment.

FIG. 11 is an example AUI showing normal use behavior for a user, under an embodiment. This is a frequent user and he/she logs in a few times a week. The normal behavior of this user consists of two normal patterns: (1) access from the San Francisco Bay Area using SBC/PacBell with a single machine; and (2) occasional access from an organization called DSS.MIL (which is a government organization) using another machine.

In this example, the FPS is configured only to process Login Attempts (i.e., the information whether a login succeeded or failed is not available to the system nor is other activities that occur within a single online session). For readability the AUI displays a separate User Name (user_26201) which is a generated for the account identifier string above.

On Apr. 2, 2007 (column adjacent marker or slide bar 1102) there were 2 RED alerts for this user.

Figure 12:
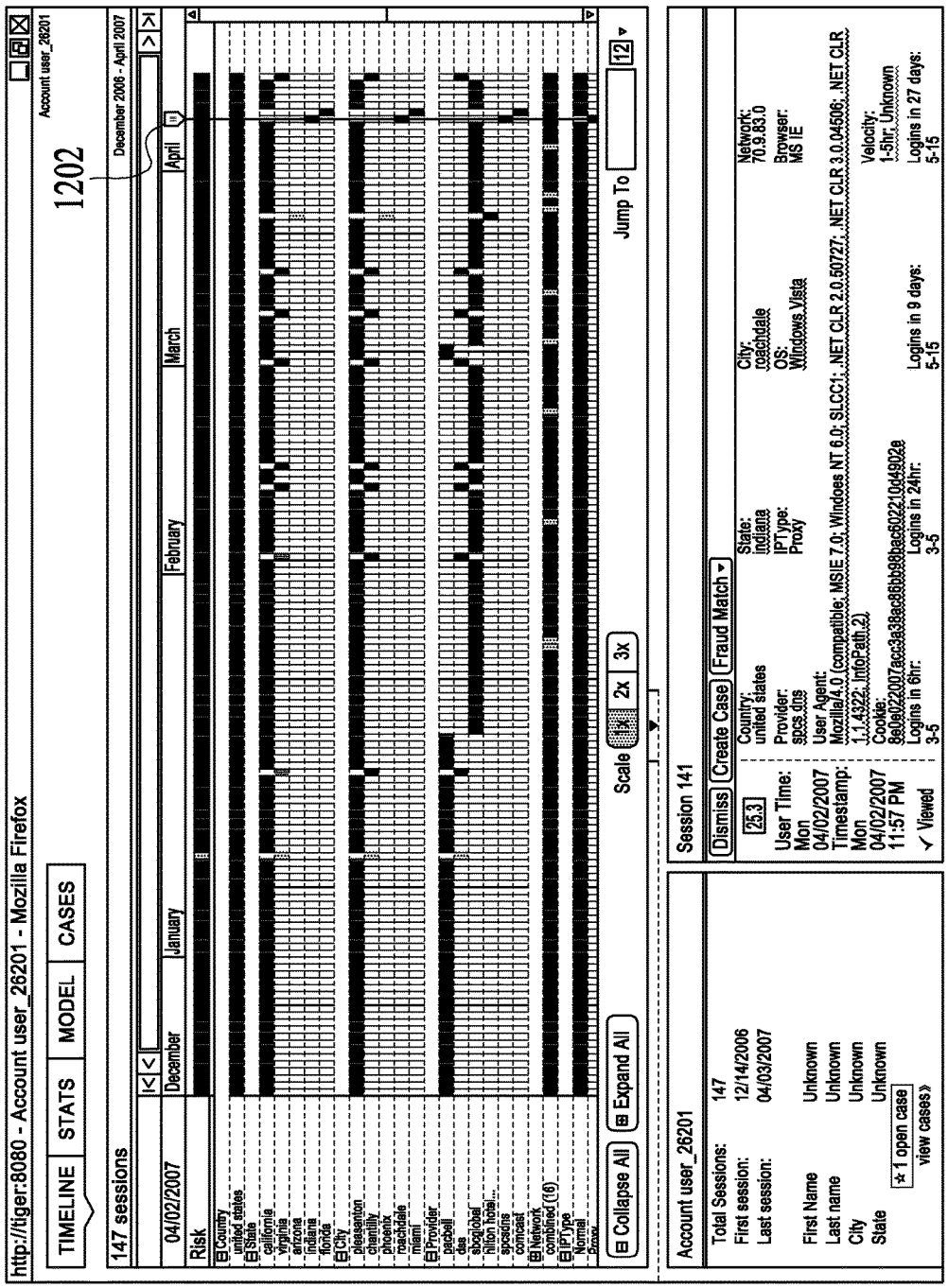
FIG. 12 is an example AUI showing a first RED alert for a user, under an embodiment.

FIG. 12 is an example AUI showing a first RED alert for an account event 1202, under an embodiment. An attempted login occurred from Network Block 70.9.83.0 using a provider "spcsdns.net" via a proxy located in Indiana. Upon further investigation, it is believed that this network is operated by Sprint Mobile Broadband and that the IP address is a proxy which may hide the true location of the user (i.e., the user may not be in Indiana). The attempt was from a new OS (Vista) that had not been seen from this user. The login was at Apr. 2, 2007 11:57 PM GMT, or Apr. 2, 2007 06:57 PM Indiana Time.

Figure 13:
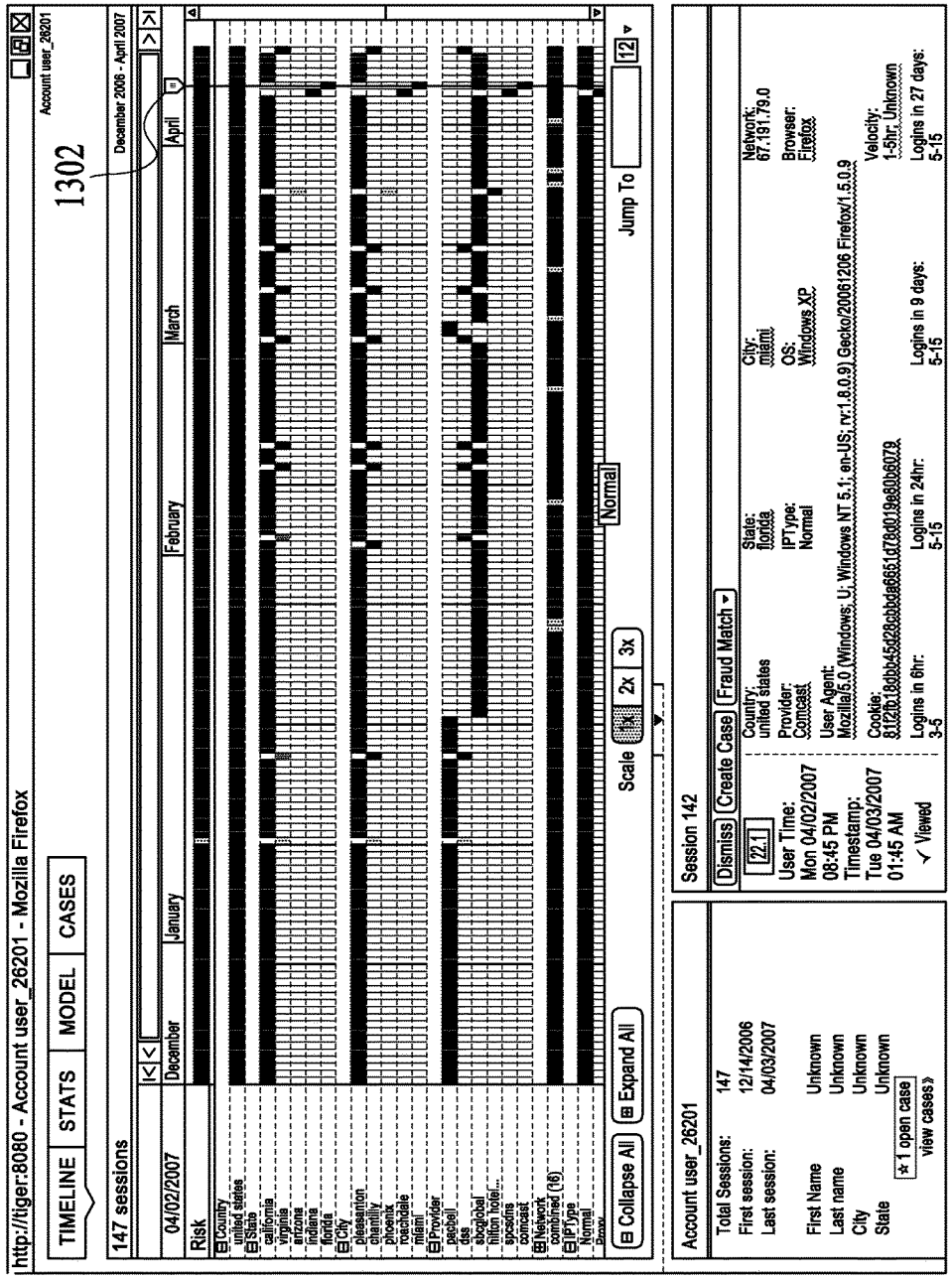
FIG. 13 is an example AUI showing a second RED alert for a user, under an embodiment.

FIG. 13 is an example AUI showing a second RED alert for an account event 1302, under an embodiment. The second Red alert occurred approximately 2 hours after the first RED alert, and was an attempted login from Network Block 70.9.83.0 using a provider Comcast from Miami, Fla. In this case the Browser (Firefox) was different from any previous session from this user. The login was on Tue Apr. 3, 2007 01:45 AM GMT, or Mon Apr. 2, 2007 08:45 PM Miami Time.

Figure 14:
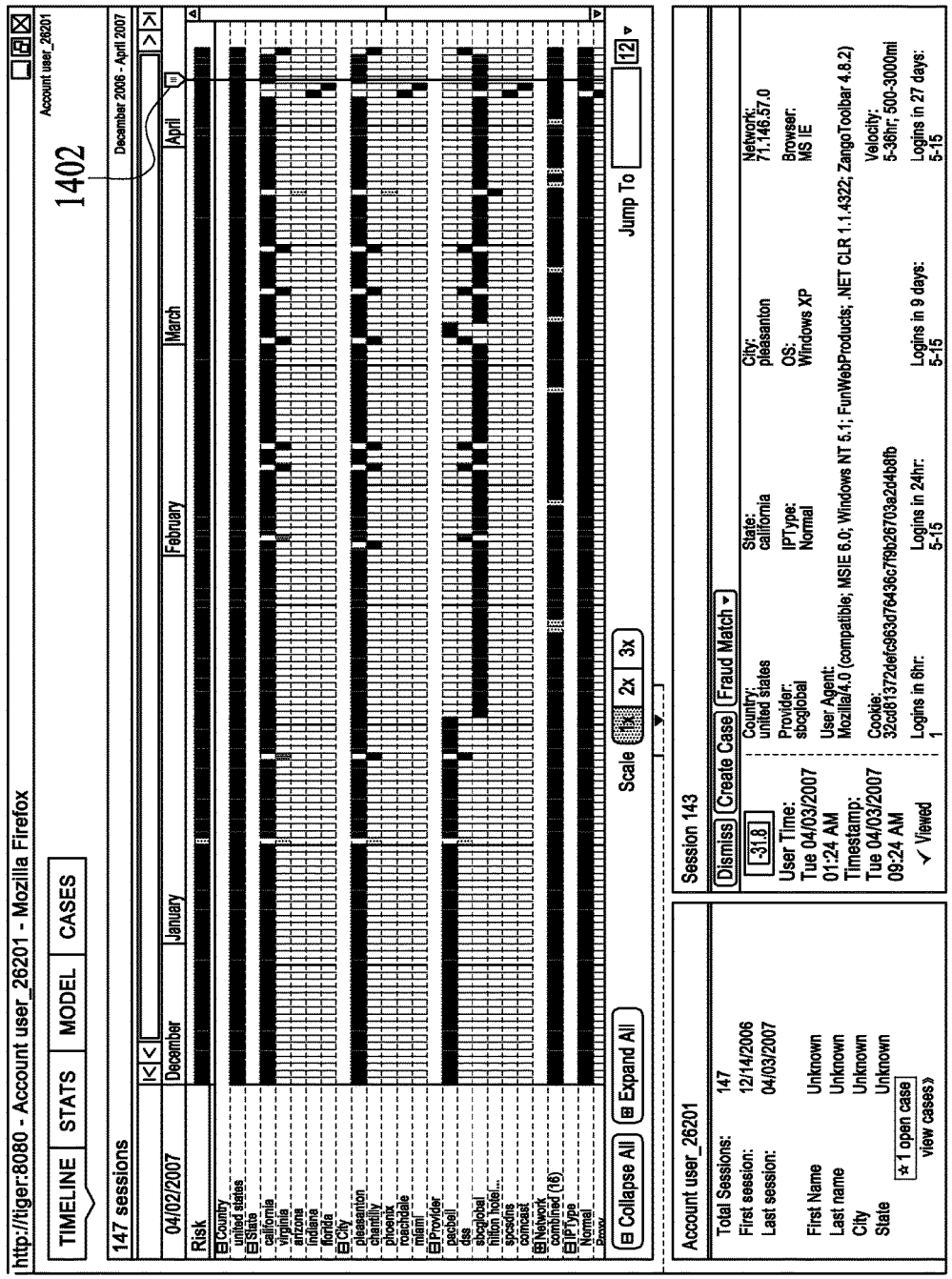
FIG. 14 is an example AUI showing additional for a user account, under an embodiment.

FIG. 14 is an example AUI showing additional information for account activity 1402, under an embodiment. This activity occurred eight hours later and was a sequence of four login attempts (probably failed logins) from what appears to be the real account holder. It was also noted that on March 21 a user (probably the real user) logged in from a Hilton Hotel in Phoenix; there is probably no reason to relate this to the fraud situation, but it may be worth noting for future reference.

Figure 15:
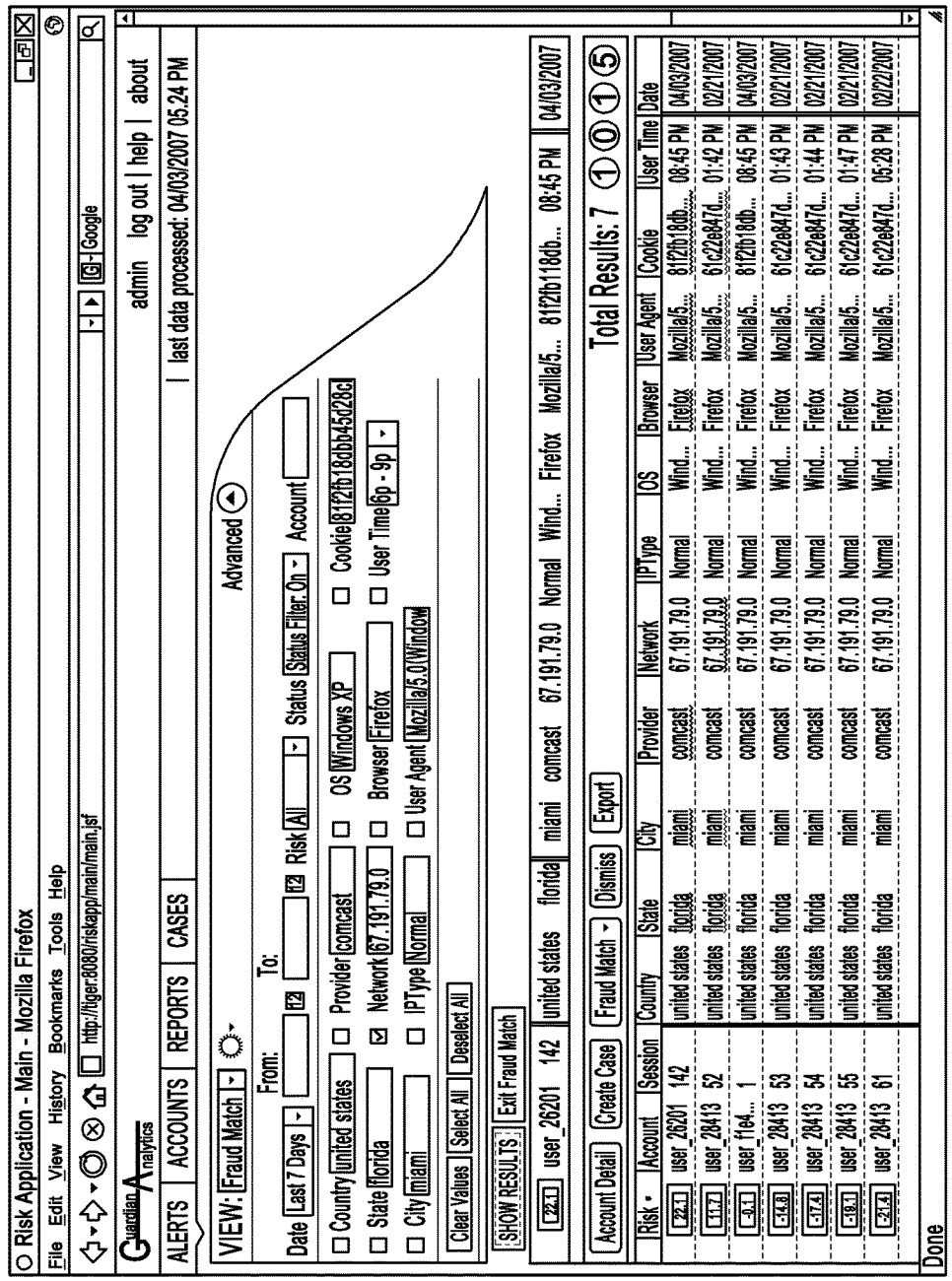
FIG. 15 is an example AUI showing the Fraud Match view, under an embodiment.

The FPS Fraud Match was used to search for other similar user sessions. FIG. 15 is an example AUI showing the Fraud Match view, under an embodiment. A search was performed for other user sessions using the Comcast network block 67.191.79.0. The only sessions identified were as follows: the five sessions from a previous fraud case; one session from this fraud case; and the additional session corresponding to the first RED alert.

Figure 16:
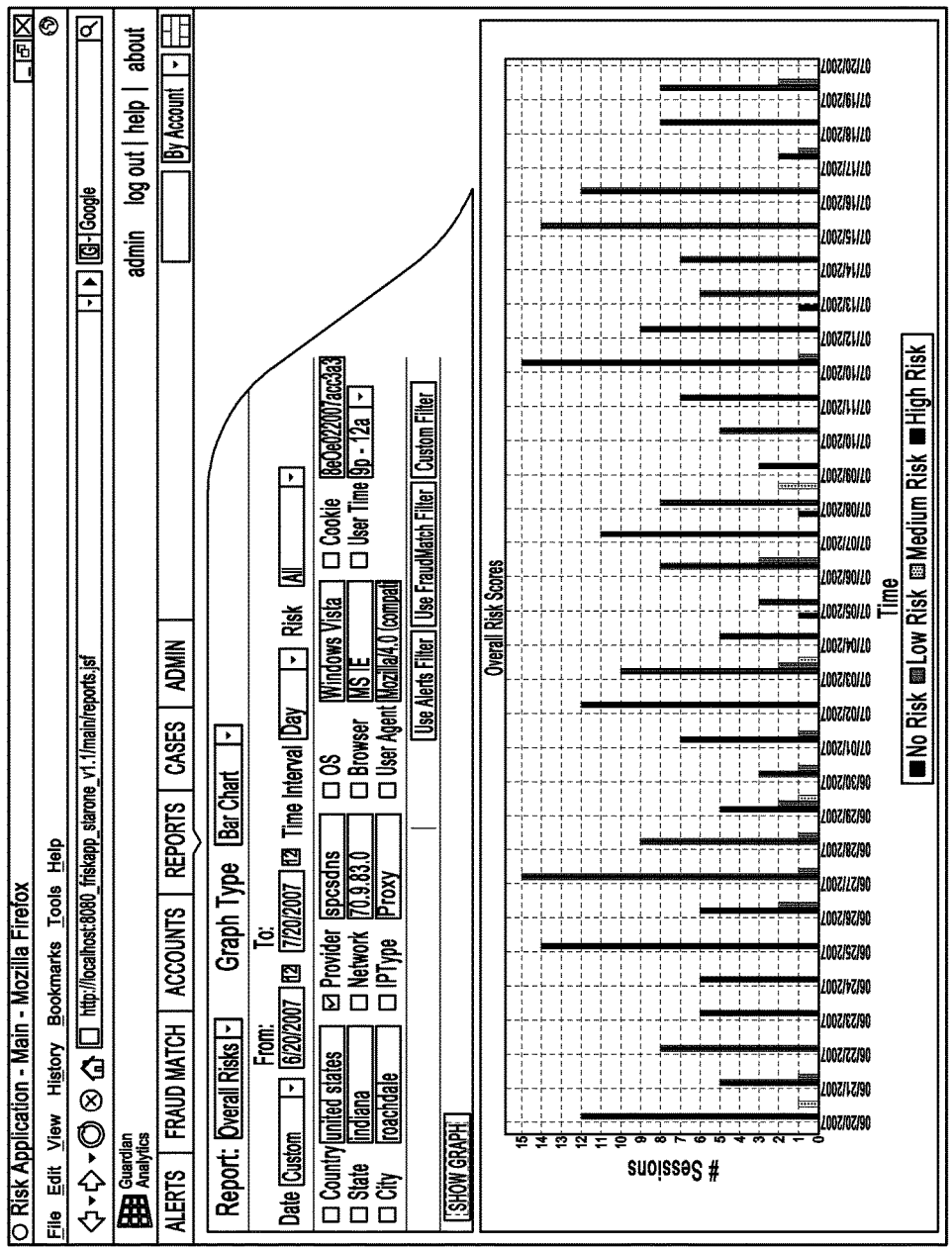
FIG. 16 is another example AUI showing the results obtained in the Fraud Match View plotted over time, under an embodiment.

FIG. 16 is another example AUI showing the results obtained in the Fraud Match View plotted over time, under an embodiment. The ability to perform various analyses of related events provides unique insight. In this example, the timeline view allows the analyst to determine if the related suspicious activity is changing over time (perhaps as a result of a wide spread fraud attack).

A detailed description of the dynamic account modeling follows.

Risk Based Hypothesis Test

A Bayesian Network is a well known representation of a probabilistic model that represents a set of variables and their probabilistic independencies as a graph of nodes (parameters) and edges (dependent relations). Bayesian Hypothesis Testing is a well known technique that can determine the optimal decision criteria for discriminating between two or more possible hypotheses given a set of observed data and known probability models for each hypothesis.

The Account Holder (User) is the real world person that owns the online account. In the case of ID Theft, a Fraudster is defined herein as any person other than the Account Holder. Mathematically, two hypotheses are:

$H_0$=The observed event (for example, a login event) was generated by the Account Holder (aka User)

$H_1$=The observed event (for example, a login event) was generated by someone else (i.e., a Fraudster)

If the true conditional probability was known by observing the current event given that the event was generated by the real User and conditional probability that the event was generated by a Fraudster, the optimal fraud/non-fraud decision statistic is the relative likelihood ratio L as defined by $$L(\text{Event}) = \frac{P(\text{Fraudster} | \text{Event})}{P(\text{User} | \text{Event})} = \frac{P(F|E)}{P(U|F)}. \quad (0.1)$$

Using Bayes Rule, Equation (0.1) can be rewritten as:

$$L(E) = \frac{P(E|F)P(F)}{P(E|U)P(U)}, \quad (0.2)$$

and, alternatively as:

$$L(E) = \rho\lambda(E) \quad (0.3)$$

where $$\lambda(E) = \frac{P(E|F)}{P(E|U)}, \text{ and } \rho = \frac{P(F)}{P(U)} = \frac{P(F)}{1-P(F)}$$

The following apply in the above equations:
P(E|F) is the Fraud Model, which is the expectation of observing the parameters of Event E given that the Event was caused by a Fraudster (someone other than the User)
P(E|U) is the User Model, which is the expectation of observing the parameters of Event E given that the Event was caused by the real User
P(F) is the Prior Probability of Fraud (aka, the apriori Fraud Expectation), which is the prior probability that an Event would be caused by a Fraudster (without knowing anything else about the Event)
P(U) is the Prior Probability of the User (aka, the apriori User Expectation), which is the prior probability that an Event would be caused by a Fraudster (without knowing anything else about the Event)

The Prior Probabilities and hence $\rho$ are constant if the Events are independent from each other. When this is the case, the impact of $\rho$ can be ignored as any decision criteria on L(E) can be performed (with appropriate scaling) on the Decision Statistic $\lambda(E)$ instead.

For example, $\lambda(E)$ can be used as part of a binary decision process by introducing a threshold:

Decide Fraud if $\lambda(E) > \tau$

Decide User if $\lambda(E) \leq \tau$ (0.4)

Alternatively, $\lambda(E)$ can be used to rank a set of Events from high to low fraud risk.

Often it is easier to work with the log likelihood ratio. The Risk of an Event is formally defined herein to be:

$$R(E) = \ln(\lambda(E)) = \ln\left(\frac{P(E|F)}{P(E|U)}\right) \quad (0.5)$$

Then R(E) is used as a decision statistic in the same way as $\lambda(E)$ or L(E) are used.
Predictive Models The problem now becomes how to calculate R(E). And, more specifically, how to calculate the two conditional probabilities P(E|F) and P(E|U). In this case, a sequence of Events is observed associated with a User's Account with the k'th Observed Event designated as $E^k$. Also, knowledge of the User can be updated based on previous observations. This previously observed information about a User is denoted as $U^{k-1}$ such that $P(E|U^{k-1})$ represents the estimated User Model after observing the sequence of Events $E^1 \ldots E^{k-1}$. Thus, Equations (0.3) and (0.5) can be rewritten as:

$$L(E^k) = \rho\lambda(E^k) \quad (0.6)$$

$$\rho = \frac{P(F)}{1-P(E)} \approx P(F)$$

for $P(F) \ll 1$ $$\lambda(E^k) = \frac{P(E^k|F)}{P(E^k|U^{k-1})}$$

$$R(E^k) = \ln(\lambda(E^k))$$

Note that in this model the Event Fraud Model $P(X^k|F)$ and the a priori expectations of Fraud (and the User) are constant, i.e., they do not change based on observing the previous Events $E^1 \ldots E^{k-1}$.

In practice, the conditional probabilities are expressed in terms of actual observed data for the Event. In this case the observed data is the set of parameters that the online application is able to collect about the Event (for example the Client IP Address and the User Agent String of the user's browser) at the time of the Event. This represents the observed parameters (i.e., the Observed Data) for the by the vector $D^k = [X, Y, \ldots, Z]$, where each element represents one of the observed parameters.

The definitions of the Fraud and User Models can be represented as:

$$P(E^k|F) = P(D^k|F) = P(X, Y, \ldots, Z|F) \quad (0.7)$$
$$\triangleq \text{Fraud Model}$$

$$P(E^k|U^{k-1}) = P(D^k|U^{k-1}) = P(X, Y, \ldots, Z|U^{k-1})$$
$$\triangleq \text{User Model}$$

Each of these is a predictive model over the observed parameters, one for the fraudster and one for the user. When calculating $\lambda(E^k)$ and $R(E^k)$ there is an interest in the ratio of these models which will be able to be used to an advantage in some real world cases.

For purposes of explanation, there are two directly observable parameters assumed:
X=The IP address associated with the HTTP session
Y=The User Agent String of the device used to access the application Then for an observed event, D=(IP Addr=x, User Agent=y) calculations are:

$$\lambda(E) = \frac{P(IPAddr = x, UserAgent = y|F)}{P(IPAddr = x, UserAgent = y|U)} \quad (0.8)$$

The problem is that these probabilities are typically unknown and in general difficult if not impossible to calculate in this form. Even if independence is assumed between the observed parameters this would be faced with simpler yet still intractable problem of computing the individual terms (or at least the individual ratios) of the resulting likelihood ratio:

$$\lambda(E) = \frac{P(IPAddr = x|F)P(UserAgent = y|F)}{P(IPAddr = x|U)P(UserAgent = y|U)} \quad (0.9)$$

This problem is solved by decomposing the probability into more manageable components. One way of doing this is to introduce the derived, real-world behavior parameters as described previously as a conditioning parameter. For example, P(IP Addr=x|U) could be reformulated as:

$$P(IPAddr = x \mid U) = \sum_{Country} P\binom{IPAddr = x \mid U,}{Country = y} P(Country = y \mid U)$$

This approach of decomposing complex probability models into a more computationally feasible network of causally related parameters is key to the Dynamic Account Modeling approach. Once the models have been reformulated as a causal model, the Bayesian Network formalism allows for propagation of information through a network of related parameters. To simplify the following discussion, this will often focus on the case with only one observed parameter X. Extending this to a full Bayesian Network that represents the entire PUM as described herein by introducing conditional parameters and distributions.

The User Model

To facilitate explanation, a description follows of the underlying math for a class of parameters that have the characteristics of discrete (it can only take on well defined set of values), finite cardinality (there are a finite (the perhaps unknown) set of values), and categorical (each value is independent of other values, i.e., there is no explicit or implicit ordering or distance between values). Similar models can be developed for other parameter types (for example, continuous parameters). Similarly, extending to conditional parameters is also straight forward under the teachings herein.

A number of variables are described as follows:
$U^k$ designates the updated User Information (Model) after k Events have been observed
$X^{k+1}$ is the observed parameter for Event k+1 where $X \in \{x_1, x_2, \ldots, x_n\}$ The predictive User Model (distribution) on $X^{k+1}$ is a vector:

$$P(X^{k+1} \mid U^k) = P(X \mid U^k) \qquad (0.10)$$
$$= \begin{Bmatrix} p(x_1 \mid U^k), \\ p(x_2 \mid U^k), \ldots, \\ p(x_n \mid U^k) \end{Bmatrix}$$

Similarly, before any Events for the User are observed this will have a prior distribution on X as:

$$P(X^1 \mid U^0) = P(X \mid U^0) \qquad (0.11)$$
$$= \begin{Bmatrix} p(x_1 \mid U^0), \\ p(x_2 \mid U^0), \ldots, \\ p(x_n \mid U^0) \end{Bmatrix}$$

Combining Priors and Observations

One method for combining the prior probability distribution and the observed events is to use a Dirichlet Distribution. Other distributions or combining techniques may also be used. The Dirichlet Distribution is used to estimate an unknown multinomial probability distribution. More specifically, it extends the Beta distribution into multiple dimensions and provides for a smooth transition between the prior distribution and the observed distribution and allows for control over how quickly that transition occurs.

The Dirichlet distribution is a second order distribution (a distribution on a distribution). For example, for an event parameter X that can take on one and only one value per event $X \in \{x_1, x_2, \ldots, x_m\}$ and $P_X = \{p(x_1), p(x_2), \ldots, p(x_m)\}$, the Dirichlet distribution on $P_X$ can be expressed as:

$$p(P_X) = D(P_X \mid P_X^0, \alpha) \qquad (0.12)$$

and $$D(P_X \mid P_X^0, \alpha) \triangleq \prod_i (p(x_i))^{(\alpha p^0(x_i)-1)} \qquad (0.13)$$

Here,
$p(P_X)$ is a scalar that is the probability that the probability distribution $P_X$ is correct
$P_X^0 = [p^0(x_1), \ldots, p^0(x_m)]$ is the apriori (assumed) distribution (vector) over X, and
$\alpha$ is a scaling factor (in units of number of observations) that essentially represents how much belief is put into the prior distribution. That is, it controls the rate of convergence away from the prior and toward the observed distribution.

Following the derivation, the maximum likelihood estimate $\hat{P}_X = E[P_X]$ as given by:

$$\hat{P}_X = E[p(x_i) \mid P_X^0, \alpha, m_i, k] = \frac{\alpha p^0(x_i) + m_i}{\alpha + k}, \qquad (0.14)$$

where $m_i$ is the number of times $x_i$ was observed and $$k = \sum_j m_j$$

is the total number of observed events.

The Dirichlet can be used as an estimate of the predictive User Model so that each element $p(x_i \mid U^{k-1})$ of Equation (0.10) can be estimated as:

$$\hat{p}(x_i \mid U^{k-1}) = \frac{\alpha p(x_i \mid U^0) + m_i}{\alpha + k} \qquad (0.15)$$

The Dirichlet Model (Equation (0.15)) can be rewritten as:

$$\hat{p}(x_i \mid U^{k-1}) = \beta p(x_i \mid U^0) + (1 - \beta)\left(\frac{m_i}{k}\right), \qquad (0.16)$$

where $$\beta = \frac{\alpha}{\alpha + k}$$
$$1 - \beta = \frac{k}{\alpha + k}.$$

Hence, the estimated User Model provides a smooth and intuitive transition between the prior and observed distribution on X for a given User. The rate of convergence to the observed distribution is controlled by the parameter $\alpha$ which is in units of k (i.e., observed events).

This is a good model for some parameter types, however, it fails to account for other expectations on user behavior. Notable, for some parameter types (e.g., location) only a few observed values are expected for any given User. And for these parameters, the expectation of seeing a new parameter value may be based on the User's previously observed behavior. A model for incorporating this type of expectation is addressed in the next subsection.

Modified Event Model (New Mode Probability)

The Modified Event Model takes into account the expectation that a single user will only be observed with a finite set of parameter values. Furthermore, it recognizes that a user switching to a new (previously unobserved) parameter value is an event of interest unto itself. For example, an individual user in one or perhaps a small number of different countries is expected, and seeing the user in a new country is an interesting occurrence.

Consider the observed Random Variable X with all of the definitions from the previous section. While awaiting the $k+1^{th}$ observation, this can characterize the possible outcomes using a modified experiment based on a new random variable $\mathbb{N}$ where $\mathbb{N}^{k+1}$ =FALSE if the observed value $X^{k+1}$ has been previously observed (for that user) and $\mathbb{N}^{k+1}$ =TRUE if this is the first time observing the value (for that user). In other words, $\mathbb{N}^{k+1}$ =TRUE is a New Mode Event. This can define the New Mode Probability $\eta$ as:

$$P(\mathbb{N} \mid U) = \begin{vmatrix} \eta & \text{if } \mathbb{N} = \text{TRUE} \\ 1 - \eta & \text{if } \mathbb{N} = \text{FALSE} \end{vmatrix} \quad (0.17)$$

Combining the New Mode Event with the actual observed value, this can be written as:

$$p(x_i \mid U^k) = \begin{vmatrix} \eta \dfrac{p(x_i \mid U^0)}{1 - \upsilon} & \text{if } x_i \text{ not previously observed} \\ (1 - \eta)\hat{p}(x_i \mid U^{k-1}) & \text{if } x_i \text{ has been previously observed,} \end{vmatrix} \quad (0.18)$$

where the following are defined:
  $\eta$ is the New Mode Probability for this user based on the previous Events observed. The new mode probability $\eta$ can be modeled in many different ways including statistical models based on historic data
  $\upsilon$ is the previously observed prior probability mass for X, specifically $$\upsilon = \sum_{(x_i \text{ Previously Observed})} p(x_i \mid U^0) \quad (0.19)$$

$$= 1 - \sum_{(x_j \text{ NOT Previously Observed})} p(x_j \mid U^0)$$

And $\hat{p}(x_i \mid U^{k-1})$ is the estimated probability of the previously observed value $x_i$, for example, Equation (0.16). The decision to use the New Mode Model (i.e., Equation (0.19) or it's variants) versus a more traditional model such as the or the Dirichlet Model (i.e., Equation (0.16)) is determined by the type of parameter being modeled. If the parameter includes a strong expectation on whether a new mode (value) should be observed then Equation (0.18) provides additional fidelity in this respect. However, if the parameter is best modeled simply as an expectation of its value, then Equation (0.16) provides a simpler and mode direct way of modeling this behavior.

The Trust Model

The Trust Model accounts for the fact that an Event observed for a User could have been caused by a Fraudster. If that were the case, the User Model should not be updated with the observed information. Of course, this must be done probabilistically as the system is never absolutely certain whether the Event was caused by the User or a Fraudster.

The Trust Model is particularly important for fraud scenarios that occur over multiple sessions. This helps prevent a Fraudster from fooling the system (by biasing the model) with a number of benign-looking sessions before attempting more suspicious activity.

The basic idea is to consider two possible updated User Models after observing an Event.
  1. $U^+$ is the resulting User Model that includes the impact of a previous Event E
  2. $U^-$ is the resulting User Model that ignores the impact of a previous Event E Then, the likelihood of a subsequent Event E' can be written as:

$$P(E' \mid U) = P(E' \mid U^+)P(U^+ \text{ is correct} \mid U) + \quad (0.20)$$
$$P(E' \mid U^-)P(U^- \text{ is correct} \mid U)$$
$$= P(E' \mid U^+)P(U^+ \text{ is correct} \mid U) +$$
$$P(E' \mid U^-)(1 - P(U^+ \text{ is correct} \mid U))$$

Where $P(U^+$ is correct$\mid U)$ is essentially the probability that the Event E was in fact caused by the User. This term is defined as the Trust of the Event, $T_E$:

$$T_E \triangleq P(U^+ \text{ is correct} \mid U) \quad (0.21)$$
$$= 1 - P(U^- \text{ is correct} \mid U)$$
$$\triangleq P(\text{That User } U \text{ was the cause of observed Event } E)$$
$$= P(U \mid E)$$
$$= 1 - P(F \mid E)$$

Combining this with Equations (0.1) and (0.3) yields:

$$\rho\lambda(E) = L(E) \quad (0.22)$$
$$= \frac{P(F \mid E)}{P(U \mid E)}$$
$$= \frac{1 - P(U \mid E)}{P(U \mid E)}$$
$$= \frac{1 - T_E}{T_E}$$

Rearranging to solve for $T_E$:

$$T_E = \frac{1}{1 + \rho\lambda(E)} \quad (0.23)$$

$$\rho = \frac{P(F)}{1 - P(F)} \approx P(F)$$

Intuitively, P(F) will always be <<1 so that when the relative likelihood ratio $\lambda(E)$<<1/P(F), the Trust of the Event will be≈1. Conversely, the Trust of the Event will be significantly reduced when $\lambda(E) \geq 1/P(F)$.

The Trust of previous Events can be used in the estimate (update) of the User Model. For the Dirichlet User Model described in Equation (0.16), the Accumulated Trust can be used instead of the Count Observed for deriving the Predicted User Model each parameter value (aka Mode). Specifically:

$$\hat{p}(x_i \mid U^{k-1}) = \beta_\tau p(x_i \mid U^0) + (1 - \beta_\tau) \frac{\tau_i}{\sum_j \tau_j} \quad (0.24)$$

Where the prior weight coefficient $\beta_\tau$ is now calculated based on the Accumulated Trust over all observed values for the parameter, i.e.:

$$\beta_\tau = \frac{\alpha}{\alpha + \sum_j \tau_j} \quad (0.25)$$

Here the following are followed:
  $p(x_i|U^0)$ is the prior (user) probability of observing the value $x_i$
  $\alpha$ is the Dirichlet scaling factor (in units of the number of observations)
  $\tau_i$ is the Accumulated Trust of the Events in which $x_i$ was observed for this user:

$$\tau_i = \sum_{E \text{ where } X = x_i} T_E$$

$$\sum_j \tau_j$$

is the total Accumulated Trust across all observed values of X for this user

Referring back to the definition and interpretation of $T_E$ in (Equation (0.23)), in cases where the Event is generally consistent with the User Model (ie., $\lambda(E)$<<1/P(F)), $T_E \approx 1$ so this equation behaves equivalently to the original Dirichlet Model (Equation (0.15)). However if an Event has very high risk ($\lambda(E) \geq 1/P(F)$), the resulting $T_E$ may be significantly less than 1 and it will have a correspondingly reduced influence to the resulting updated User Model. Likewise, the Trust Score can be used in the New Mode Model of Equation (0.18) by using a similar substitution.

Time Decay Model

The derivation of the User Model up to this point does not factor in the passage of time and more specifically that the User may change the behavior over time such that observed behavior a long time ago may not reflect the current expected behavior. This issue is addressed by introducing a Time Decay Model for the User Model.

The basic idea behind the Time Decay Model is that the relevancy of an observed event decreases over time. The exponential decay function forms a computationally attractive basis of the model. Using an exponential decay function, the relative weight of each event decays according to the function:

$$\omega(t, t_{Event}) = e^{-\frac{t - t_{Event}}{\lambda}} \quad (0.26)$$

The following apply for this function:
  t is the current time (or any time after the Event was observed)
  $t_{Event}$ is the time the Event was observed
  $\lambda$ is the decay parameter (in the same unit as t) of the model This weighting function can be applied recursively from one point in time to another. Specifically, for two future points in time $t_2 > t_1 > t_{Event}$:

$$\omega(t_2, t_{Event}) = e^{-\left(\frac{t_2 - t_{Event}}{\lambda}\right)} \quad (0.27)$$

$$= e^{-\left(\frac{(t_2 - t_1) + (t_1 - t_{Event})}{\lambda}\right)}$$

$$= e^{-\left(\frac{t_2 - t_1}{\lambda}\right)} e^{-\left(\frac{t_1 - t_{Event}}{\lambda}\right)}$$

$$= \omega(t_2, t_1) \omega(t_1, t_{Event})$$

With this background, the Time Decay Model is now described. Define $M_i(t)$ as the Accumulated Observed Mass for the parameter value $x_i \in X$. The Accumulated Observed Mass could be based on Event Count (i.e., the base weight for each Event is 1) the Trust of an Event (the base weight for an Event is $T_E$) or some other metric that weights each observed Event. However, as defined, the Accumulated Observed Mass can also vary over time.

Using the exponential decay function, a definition of specific form for the Accumulated Observed Mass for a given time t given a specific exponential time constant is:

$$M_{\lambda,i}(t) = M_{\lambda,i}^{Last} e^{-\frac{(t - t_i^{Last})}{\lambda}} \quad (0.28)$$

The following apply for the Accumulated Observed Mass:
  $M_{\lambda,i}^{Last} = M_{\lambda,i}(t_i^{Last})$ is the Accumulated Observed Mass for the value $x_i$ immediately after the last Event in which $x_i$ was observed.
  $t_i^{Last}$ is the timestamp of the last Event in which $x_i$ was observed. The value of $t_i^{Last}$ is stored as part of the User Model (each $x_i$ has its own $t_i^{Last}$)
  t is the current time and is usually set by the time of the next Event to evaluate
  $\lambda$ is the exponential time constant and is a static parameter of the model.
  $M_{\lambda,i}^{Last}$ and $t_i^{Last}$ are calculated recursively as part of the User Model Update process. Specifically, whenever an Event is observed that contains the value $x_i$, the User Model is updated using $$M_{\lambda,i}^{Last|k} = m_i^{E^k} + M_{\lambda,i}^{Last|k-1} e^{-\frac{(t^{Event} - t_i^{Last|k-1})}{\lambda}}, \quad (0.29)$$

$$t_i^{Last|k} = t^{Event}$$

where:
- $M_{\lambda,i}^{Last|k}$ is the new (updated) Accumulated Observed Mass for the value $x_i$ immediately after the current Event k (in which $x_i$ was observed)
- $M_{\lambda,i}^{Last|k-1}$ the Accumulated Observed Mass for $x_i$ prior to observing the most recent Event
- $m_i^{E^k}$ is the Incremental Observed Mass for x, based for the current (single) Event k.
  - If the Observed Mass is based on Count Observed, then $m_i^{E^k} = 1$
  - If the Observed Mass is based on the Event Trust, then $m_i^{E^k} = T_{E^k}$
- $t^{Event}$ is the timestamp of the most recent Event k (in which $x_i$ was observed)
- $t_i^{Last|k}$ is the new (updated) Last Time Observed for the value $x_i$ based on Event k
- $t_i^{Last|k-1}$ is the Last Time Observed for the value $X_i$ prior to this most recent Event If this is the first time $x_i$ is observed (for this User), the initial update reduces to:

$$M_{\lambda,i}^{Last|k} = m_i^{E^k} \quad (0.30)$$

$$t_i^{Last|k} = t^{Event}$$

Evaluating an Event follows exactly the same process with the Time Decay model as without except that the Accumulated Observed Mass $M_{\lambda,i}(t)$ is used instead of the Count Observed or the Accumulated Trust in calculating the Risk Score of an Event. Specifically, $M_{\lambda,i}(t)$ is used instead of $m_i$ in Equation (0.16) if the Event Count is used as the basis of $m_i^{E^k}$. Also, k (which is now real-valued) is calculated using the summation $$\sum_j M_{\lambda,j}(t)$$

which sums the Accumulated Observed Mass over all previously observed values $x_j$.

$M_{\lambda,i}(t)$ is used instead of $\tau_i$ in Equation (0.24) or if the Event Trust is used as the basis of $m_i^{E^k}$. Similarly, the normalization is now done using the summation $$\sum_j M_{\lambda,j}(t)$$

instead of $$\sum_j \tau_j$$

More complex decay models can be used, for example a weighted average of multiple exponential decays.

Fraud Impersonation Model

The formulation described above assumes that the Fraudster acts independently of the User, i.e., that the Fraudster does not know anything about users in general or about the specific User and/or even if the fraudster did the fraudster would not be able or choose to do anything different because of that knowledge. As fraudsters become more sophisticated this assumption no longer holds and may impact the performance of the algorithm.

The Impersonation Model addresses this issue. Consideration may be given to two related but different scenarios:

1. The Fraudster has knowledge of Users in general (perhaps for a particular target bank). Essentially, the Fraudster may be able to use this knowledge to guess what a typical user might do. For example a Fraudster attacking a US bank might safely assume that most Users will access the online application from the US so the fraudster may use a US proxy to hide the fraudster's location and perhaps more importantly to look like a normal user. Of course, this is more relevant for some parameters (e.g., Country) but not for others because the fraudster may be unable to sufficiently guess what an user may use (e.g., in the case of a User Agent String) and/or it would be difficult to mimic their behavior (e.g., to come from the exact same network block).
2. The Fraudster has been able to learn something about a specific User (perhaps by collecting data from a Phishing Site or by installing Malware on the User's machine). And based on this information the fraudster may change the attack profile to look like that specific User. This creates more opportunities and a more sophisticated attack profile. Still, this is more relevant to some parameters than others. For example, it is relatively easy to look like a specific User Agent String but it is much more difficult to use the exact same network block (which would require sophisticated malware on the user's machine).

Both cases are based on the same basic model, however this model is applied at different times: 1) the ability to guess is handled by adjusting the Parameter Priors for the Fraudster while 2) the ability to actively impersonate a specific user is handled dynamically.

For the case that a Fraudster can guess the behavior of users in general, adjustments can be made to the Parameter Priors in the Fraud Model to account for this possibility. In particular, this defines the probability that a Fraudster could guess the behavior of users for each parameter in the model:

$P_{Guess} \triangleq$ Probility that Fraudster guesses parameter value. (0.31)

Essentially, this says that with probability $P_{Guess}$ the Fraudster knows the prior probability (for the specific parameter) of Users in general (for the specific target bank and/or application). This can be easily factored into the model by modifying the Fraud Parameter Prior for the parameter being considered. This is done using:

$$P(X|\hat{F}^0) = P_{Guess} P(X|U^0) + (1 - P_{Guess}) P(X|F^0) \quad (0.32)$$

This modified Fraud Parameter Prior is used instead of the original Fraud Parameter Prior. In practice, this is done offline and the Risk Engine simply uses the modified Fraud Parameter Prior values.

The more interesting and challenging case is when a Fraudster is actually able to observe a User and then to mimic the behavior (or at least the observed parameters). In this case the Impersonation Model must take into account a number of effects as follows: the probability that a Fraudster would try to mimic a particular observed parameter; the probability that the Fraudster is able to observe (or otherwise learn about) a specific behavior (observed parameters) of a specific User (e.g., the Fraudster is able to observe the actual IP address or User Agent string that a User would have while accessing the online application); the probability that the fraudster is able to mimic the specific parameter value that was observed for the User. For any particular parameter this models the probability of the combination of these conditions by a single, statically defined parameter as follows:

$$P_{Imp} \triangleq \text{Probility that Fraudster successfully impersonates the parameter value} \quad (0.33)$$

Then, at any point in time the resulting Fraud Model is a probabilistic combination of the original Fraud Model (which is simply the prior) and the Impersonated User Model.

$$P(X^k|F^{k-1}) = P_{Imp}P(X^k|U^{k-1}) + (1-P_{Imp})P(X^k|F^0) \quad (0.34)$$

This model can be used directly in the calculation of the Likelihood Ratio and Risk for an Event (see Equation (0.6)):

$$\lambda_{Imp}(X^k) = \frac{P_{Imp}P(X^k|U^{k-1}) + (1-P_{Imp})P(X^k|F^0)}{P(X^k|U^{k-1})} \quad (0.35)$$

$$= P_{Imp} + (1-P_{Imp})\frac{P(X^k|F^0)}{P(X^k|U^{k-1})}$$

$$= P_{Imp} + (1-P_{Imp})\lambda(X^k)$$

Therefore, $$R(X^k) = \ln(P_{Imp} + (1-P_{Imp})\lambda(X^k)). \quad (0.36)$$

Looking at the limits, if $P_{Imp} \ll 1$ that if the original Fraud Likelihood Ratio $\lambda(X^k) > 1$ (i.e., the original Risk is >0) that the resulting likelihood ratio and Risk is generally unaffected. However, if $\lambda(X^k) < 1$ (i.e., the original Risk is a relatively large negative number) that the inclusion of $P_{Imp}$ effectively sets a lower bound on the Risk:

$$R(X^k) \geq \ln(P_{Imp}) \quad (0.37)$$

Intuitively this makes sense as it essentially says that if a Fraudster could impersonate the observed parameters of a User this should limit the amount of confidence that is placed on observing a parameter value that would normally be expected to be seen from a User. In practice, this becomes useful when the User Model consists of many parameters and $P_{Imp}$ is defined based on the nature of each parameter. For example, it is much easier to use a proxy that would allow a Fraudster to mimic the country of the user than it would be to mimic the exact city of a user.

Also, while the full model expressed in Equation (0.34) can be used, a simplistic model that simply sets a minimum risk according to Equation (0.37) could be used and would provide much of the same value (i.e., by limiting the amount of confidence that observing one expected parameter has on the overall risk score). Thus, $P_{Imp}$ is interpreted as a conditional probability if the underlying parameter is also conditional.

Fraud Co-Occurrence Model

The Fraud Co-Occurrence Model attempts to model the observation that a fraud attack against a single online account often consists of a flurry of sessions. For example: an initial session (or sessions) may be used to steal credentials or to confirm that the stolen credentials are correct and, once that is confirmed, another attack vector will be used to carry out the fraud; multiple sessions may be used, each to carry out a piece of the fraudulent activity in an effort to keep financial activity below the radar of transaction monitoring rules; if one fraud attack is successful against an account, the fraudster may come back and try again.

Note that in these cases the sequence of fraudulent sessions may or may not have a similar profile. Also, in most cases the fraudster tries to move as quickly as they can to carry out the fraud before their activity is discovered or their access to the account is shut down. Mathematically, this implies that observing a (potentially) fraudulent session should influence the expectation that a subsequent Event may also be fraudulent. Rewriting Equation (0.3) for Event $E^k$ using the updated User Model $U^{k-1}$:

$$L(E^k) = \rho\lambda(E^k) \quad (0.38)$$

where $$\lambda(E^k) = \frac{P(E^k|F)}{P(E^k|U^{k-1})},$$

and $$\rho = \frac{P(F)}{P(U)} = \frac{P(F)}{1-P(F)}$$

In this equation P(F) is the a priori probability that any observed Event E is caused by a fraudster rather than the User. In the previous sections, assumptions that each Event is independent and that P(F) is constant such that L(E) and $\lambda(E)$ can be used as equivalent decision statistics. However, as previously discussed, this is not the case as observing one fraudulent event could change some expectation of seeing fraud (i.e., P(F)) of subsequent events.

Note, that in addition to modifying P(F) this could also include some form of dynamic event prediction model for fraud, i.e., $P(E^K|F^{k-1})$, which is done for the User Model. However this is a difficult thing to define and would add a lot of complexity to the resulting algorithms and models.

Therefore the focus is on modifying the estimate P(F) based on the previous observations (of potentially fraudulent activity). Ideally, this would be done recursively such that the resulting model would not have to remember each previous event.

One such model is the exponential decay. This model implements the assumption that subsequent fraudulent activity (on a single account) tends to occur within a limited timeframe (for example, within the same day or a few days). It also takes advantage of the favorable half-life characteristic of the time-based exponential decay model.

Specifically, assume a fraudulent Event $E_F$ at time $t_F$ was seen and there is an increased a priori expectation (that decays over time) that if a subsequent Event E' at time t' was seen that it would also be fraud. One way to model this is to use an exponential decay model for the increased a priori expectation based on knowing that $E_F$ was fraud:

$$P(F'|E_F \text{ is Fraud}) \triangleq P(E' \text{ is Fraud}|E_F \text{ is Fraud}) \quad (0.39)$$

$$= P(F_0) + (\varepsilon - P(F_0))e^{-(t'-t_F)/\mu}$$

where $P(F_0)$ is the original (before any Events are observed) a priori probability that any Event is fraud $\varepsilon$ is a parameter of the model that defines the new a priori fraud prior immediately after the event $E_F$ is observed.

µ is a parameter of the model that defines the half life decay of the increased fraud expectation.

Intuitively, upon seeing the fraudulent event $E_F$, the a priori expectation of seeing another Fraud Event immediately jumps from $P(F_0)$ to ε and then decays back to $P(F_0)$ with an exponential half-life equal to µ.

Of course, in a real situation there is no certainty that some previous Event $E_i$ is fraud. To account for this uncertainty two cases may be considered, with one case conditioned on whether $E_i$ was caused by fraud and another case conditioned on whether $E_i$ was not caused by fraud. The first case uses $P(F^k|E^i)$ as defined above as the subsequent Fraud Prior while the second uses the original Fraud Prior $P(F_0)$:

$$P(F^k|E^i)=P(F^k|E^i \text{ is Fraud})P(F^i|E^i)+P(F_0)(1-P(F^i|E^i)) \quad (0.40)$$

Using Equation (0.21) substitute $P(F^i|E^i)=1-T_{E^i}$, and rewrite as:

$$P(F^k|E^i) = P(F_0)T_{E^i} + [P(F_0) + (\varepsilon - P(F_0))e^{-(t_k-t_i)/\mu}] \quad (0.41)$$
$$(1 - T_{E^i})$$
$$= P(F_0) + (1 - T_{E^i})(\varepsilon - P(F_0))e^{-(t_k-t_i)/\mu}$$

Note, for any interesting case, $\varepsilon \gg P(F_0)$ this can further simplify as:

$$P(F^k|E^i) \approx P(F_0)+(1-T_{E^i})\varepsilon e^{-(t_k-t_i)/\mu} \quad (0.42)$$

which is the new Fraud Prior based on some previous, potentially fraudulent Event $E_i$. Note, alternatively, this could define ε as the increase in the fraud prior and in this case Equation (0.42) would be exact. In practice both methods are equivalent.

There are potentially many previously observed Events (for this User Account) and in general the possible contribution of each should be considered. This is done by introducing a Fraud Co-Occurrence Update Model.

Since the decay in the increased fraud expectation is exponential, the proportion of decay from any single Event only depends on the length of the decay interval and that $e^{-(t_k-t_i)/\mu} = e^{-(t_k-t_{k-1})/\mu} e^{-(t_{k-1}-t_i)/\mu}$. This allows a recursive model to be defined for the Fraud Prior for the next observed Event $E^k$ based on all previously observed Events $\{E^1, \ldots, E^{k-1}\}$ as:

$$P(F^k) = P(F_0) + \gamma_{k-1}\varepsilon e^{\left(\frac{-(t_k-t_{k-1})}{\mu}\right)} \quad (0.43)$$
$$\gamma_k = g(\gamma_{k-1}, T_{E^k}, (t_k - t_{k-1}))$$
$$\gamma_0 = 0$$

In this formulation, $\gamma_{k-1}$ essentially represents the Accumulated Mistrust through observed Event $E^{k-1}$. The choice of the update function $\gamma_k = g( )$ defines how the affect from multiple Events are combined. A simple recursive update model that behaves as intended can be defined as:

$$\gamma_k = \max((1-T_{E^k}), \gamma_{k-1}e^{-(t_k-t_{k-1})/\mu}) \quad (0.44)$$

Other variations are possible by using some accumulation of previous events while ensuring that $\gamma_k \leq 1$. For example, an alternative model could allow $\gamma_k$ to grow to some value if there is a plethora of highly suspicious events. For example, $$\gamma_k = (1-T_{E^k})+\gamma_{k-1}e^{-(t_k-t_{k-1})/\mu}. \quad (0.45)$$

The calculation of the Likelihood Ratio and associated Risk Score using the Fraud Co-Occurrence model can use Equation (0.42) directly. Though it is useful to see (and probably implement) the relative affect of this component. To do so, the Fraud Co-Occurrence Coefficient $\Gamma^k$ is defined to be $$\Gamma^k \triangleq \frac{\overline{L}(E^k)}{L(E^k)} \quad (0.46)$$
$$= \frac{\frac{P(E^k|F)}{P(E^k|U^{k-1})}\left(\frac{P(F^k)}{1-P(F^k)}\right)}{\frac{P(E^k|F)}{P(E^k|U^{k-1})}\left(\frac{P(F_0)}{1-P(F_0)}\right)}$$

In this case L is the original Likelihood Ratio and $\overline{L}$ is the Likelihood Ratio that incorporates the Fraud Co-Occurrence Model. Observing that the first terms in both cases are identical and $F_0 \ll 1$, this simplifies to:

$$\Gamma^k = \frac{P(F^k)}{P(F_0)(1 - P(F^k))}. \quad (0.47)$$

Substituting Equation (0.43), provides:

$$\Gamma^k = \frac{P(F_0) + \gamma_{k-1}\varepsilon e^{\left(\frac{-(t_k-t_{k-1})}{\mu}\right)}}{P(F_0)\left(1 - P(F_0) - \gamma_{k-1}\varepsilon e^{\left(\frac{-(t_k-t_{k-1})}{\mu}\right)}\right)} \quad (0.48)$$

And finally, observing that for any case of interest $P(F_0) \ll 1-\varepsilon$, this arrives at:

$$\Gamma^k = \frac{1 + Ea}{1 - \varepsilon a} \quad (0.49)$$

where $$E = \frac{\varepsilon}{P(F_0)}$$
$$a = \gamma_{k-1}e^{\left(\frac{-(t_k-t_{k-1})}{\mu}\right)}$$

so that:

$$\overline{L}(E^k) = \Gamma^k L(E^k) \quad (0.50)$$

and $$\overline{R}(E^k) = \ln(\Gamma^k) + R(E^k)$$

Hence, the Fraud Co-Occurrence Model essentially increases the Risk of a subsequent Event by an amount determined by the Accumulated Mistrust derived recursively from previous Events.

The Session Model

In addition to determining the risk of a single Event, the FPS can determine the risk of a sequence of related events. For example, in the context of online activity, a online session consists of one Login Event followed by one or more Activity Events (for example, checking an account balance, initiating a money transfer, viewing a check image, etc) and then some form of Termination Event (either an explicit logout by the user or some form of session timeout).

Consideration is given to a Generic Session Model that comprises 0, 1 or more observations of Activity Events. It is recognized that at any point in time a Session can be Open (where observing additional Activities) or Closed (and no additional Activities can be observed).

The $k^{th}$ Session for a User is denoted as:

$$S_k = (A_1, A_2, \ldots, A_N), \quad (0.51)$$

where $A_n$ is an observed Activity Event. Every Activity Event $A_n$ has a Type (or Class) attribute $C_n$ that takes the value of one of a set of predefined Types and a set of observed parameters that we designate by the vector $V_n$. Explicitly:

$$A_n = (C_n, V_n)$$

$$C_n \in \{c^1, c^2, \ldots, c^m\}$$

$$V_n = (v^1, v^2, \ldots, v^P) \quad (0.52)$$

Differentiations can be made between an Open Session (a Session that may receive future Activity Events) and a Closed Session (a Session that may not receive future Activity Events). When necessary, an Open Session is designated as $\check{S}_k$ and a Closed Session is designated as $\hat{S}_k$.

In general, the likelihood ratio and associated Risk for the Session as:

$$\lambda(S_k) = \frac{P(S_k \mid F^{k-1})}{P(S_k \mid U^{k-1})} \quad (0.53)$$

$$= \frac{P(A_1, A_2, \ldots, A_N \mid F^{k-1})}{P(A_1, A_2, \ldots, A_N \mid U^{k-1})}$$

$$R(S_k) = \log(\lambda(S_k))$$

An Online Login Session is a special case of the Generic Session Model. Specifically, (ignoring cases with failed logins), an Online Login Session starts with a Login Event (which initiates an Open Session), then has 0, 1 or more Activity Events and eventually ends with some form of Termination Event which also serves to Close the Session. The Termination Event could be an explicit Log Out by the user, or it could be a timeout by the Online Banking Application or the Risk Engine.

Essentially, the Login and Termination Events are special types of Events that also designate the start and end of a Session. The corresponding Open and Closed Sessions are defined as:

$$\check{S}_k = \{L, A_1, A_2, \ldots, A_N\}$$

$$\hat{S}_k = \{L, A_1, A_2, \ldots, A_N, T\} \quad (0.54)$$

In these definitions L denotes the Login Event and T denotes the Termination Event. By definition, there can be one and only one Login Event. Likewise, for a Closed Session there is one and only one Termination Event while Open Sessions do not have a Termination Event. In general, both L and T may have parameters and types associated with them.

In most cases we can safely assume that both the Login Event and Termination Event are conditionally independent of each other and all other Activity Events given either the specific User or Fraud model. This allows for the rewriting of Equation (0.53) for an Online Login Session Model as:

$$\lambda(S_k) = \frac{P(S_k \mid F^{k-1})}{P(S_k \mid U^{k-1})} \quad (0.55)$$

$$= \frac{P(L \mid F^{k-1}) P(T \mid F^{k-1}) P(A_1, A_2, \ldots, A_N \mid F^{k-1})}{P(L \mid U^{k-1}) P(T \mid U^{k-1}) P(A_1, A_2, \ldots, A_N \mid U^{k-1})}$$

and $$R(S_k) = \log(\lambda(S_k))$$
$$= R_L(S_k) + R_{\vec{A}}(S_k) + R_T(S_k)$$

where:

$$R_L(S_k) = \log \frac{P(L_k \mid F^{k-1})}{P(L_k \mid U^{k-1})}$$

is the Risk of the Login Event which can be computed as described above $$R_T(S_k) = \log \frac{P(T_k \mid F^{k-1})}{P(T_k \mid U^{k-1})}$$

is the Risk of the Termination Event. This can incorporate previous or expected behavior (for example, the User may always explicitly log out). In most situations both conditional probabilities are constant and usually equal to each other so this entire term can safely be ignored.

$$R_{\vec{A}}(S_k) = R(A_1, A_2, \ldots, A_N) = \log \frac{P(A_1, A_2, \ldots, A_N \mid F^{k-1})}{P(A_1, A_2, \ldots, A_N \mid U^{k-1})}$$

is the combined Risk of all Activity Events within the Session (aka Activity Risk) and is described below.

Calculating the Combined Activity Risk

An estimate of the Activity Likelihood Ratio and associated Activity Risk for Session $S_k$ are provided as:

$$\lambda_{\vec{A}}(S_k) \triangleq \lambda(A_1, A_2, \ldots, A_N) = \frac{P(A_1, A_2, \ldots, A_N \mid F^{k-1})}{P(A_1, A_2, \ldots, A_N \mid U^{k-1})} \quad (0.56)$$

$$R_{\vec{A}}(S_k) \triangleq R(A_1, A_2, \ldots, A_N) = \log(\lambda(S_k))$$

It is impractical to calculate this general form. However, estimating these terms using simpler models that are more tractable to work with captures the most salient affects. There are many ways to approach this problem. For this description the general form has been broken into three components as $$\lambda_{\vec{A}}(S_k) \approx \lambda_{\vec{A}}^{freq}(S_k) \times \lambda_{\vec{A}}^{order}(S_k) \times \lambda_{\vec{A}}^{params}(S_k) \quad (0.57)$$

where $\lambda_{\vec{A}}^{freq}$=Activity Type Frequency Model is the combined contribution from each Activity in the Session of the observed count of each Activity Type $\lambda_{\vec{A}}^{order}$=Activity Type Order Model is the combined contribution from each Activity in the Session of the specific order of the observed Activity Types. This defines $\lambda_{\vec{A}}^{order}$ such that the underlying probability of any possible order is conditioned on the Activity Type Count.

$\lambda_{\vec{A}}^{params}$=Activity Parameter Model is the combined contribution of the specific observed parameters for each Activity in the Session. This defines $\lambda_{\vec{A}}^{params}$ such that the underlying probability likelihoods are conditioned on the Type of the observed Activity and in general they may be dependent on previously observed Activities.

By taking the natural log, the corresponding Risk values are defined as $$R_{\vec{A}}(S_k) = R_{\vec{A}}^{freq}(S_k) + R_{\vec{A}}^{order}(S_k) + R_{\vec{A}}^{params}(S_k) \quad (0.58)$$

Consideration is given to each term.

For a Closed Session, $\lambda_{\vec{A}}^{freq}$ can be written as a product of likelihood ratios where the individual terms correspond to the expectation of seeing the observed number $n_c$ of each Activity Type c:

$$\lambda_{\vec{A}}^{freq}(\hat{S}_k) = \prod_{c \in \{c^1, c^2, \ldots, c^M\}} \frac{P(N_c = n_c \mid F^{k-1})}{P(N_c = n_c \mid U^{k-1})}. \quad (0.59)$$

Similarly, the Risk of an Open Session can be computed. However, for an Open Session the minimum number Activities that will be observed for that session might be known. This is manifested by using $\geq$ instead of $=$ within the probabilities:

$$\lambda_{\vec{A}}^{freq}(\tilde{S}_k) = \prod_{c \in \{c^1, c^2, \ldots, c^M\}} \frac{P(N_c = n_c \mid F^{k-1})}{P(N_c = n_c \mid U^{k-1})}. \quad (0.60)$$

Similarly, the associated $R_{\vec{A}}^{freq}$ values can be computed as:

$$R_{\vec{A}}^{freq}(\hat{S}_k) = \sum_{c \in \{c^1, c^2, \ldots, c^M\}} \log\left(\frac{P(N_c = n_c \mid F^{k-1})}{P(N_c = n_c \mid U^{k-1})}\right) \quad (0.61)$$

and $$R_{\vec{A}}^{freq}(\tilde{S}_k) = \sum_{c \in \{c^1, c^2, \ldots, c^M\}} \log\left(\frac{P(N_c \geq n_c \mid F^{k-1})}{P(N_c \geq n_c \mid U^{k-1})}\right)$$

Note that all Activity Types are included in the calculation even if no specific Activities of that type are observed in the Session.

In most cases the specific order of activities within a session is not statistically different whether conducted by a fraudster or a user. Mathematically this means assumptions might be made that:

$$\lambda_{\vec{A}}^{order} = 1$$

$$R_{\vec{A}}^{order} = 0$$

In the most general case, the expected probability distributions of the observed parameters of each Activity can be dependent on previously observed Activities. Also, in general, the relevant previous Activities could have occurred in this or some other earlier session (or a combination of both). Information from previous sessions is contained in the updated User Activity Model $U^{k-1}$ and the updated Fraud Activity Model $F^{k-1}$ (if one is used). Information about a previous Activity that occurred within the current session is available directly as all information about Activities are maintained for the life of a Session.

Therefore, in the most general form, $\lambda_{\vec{A}}^{params}$ can be written as a product of the likelihood of each Activity:

$$\lambda_{\vec{A}}^{params}(S_k) = \prod_j \lambda_{A_j}^{params} \quad (0.62)$$

where $$\lambda_{A_j}^{params} = \frac{P(V_j \mid C_j, A_1, A_2, \ldots, A_{j-1}, F^{k-1})}{P(V_j \mid C_j, A_1, A_2, \ldots, A_{j-1}, U^{k-1})}$$

And similarly:

$$R_{\vec{A}}^{params}(S_k) = \sum_j R_{A_j}^{params} \quad (0.63)$$

where $$R_{A_j}^{params} = \log(\lambda_{A_j}^{params})$$

In most cases the parameters of an Activity are independent of previous Activities (the Type of the Activity may already have been conditioned). If the parameters of an Activity are independent of any previous activities, then $$\lambda_{A_j}^{params} = \frac{P(V_j \mid C_j, F^{k-1})}{P(V_j \mid C_j, U^{k-1})} \quad (0.64)$$

Session Cost Model

From a business and risk perspective, different types of Activities may carry different costs. For example, missing fraud on a Money Transfer is probably more costly than missing fraud on Checking Account Balance. To accommodate this, the concept of Cost is introduced when computing the Risk of a Session.

Keeping with this decision theory approach where a possible cost is assigned to each decision outcome, and since this decision space is essentially to declare a Session as Fraud or User, there may be four possible outcomes for a decision:

FPS determines a Session is Fraud when in fact it was from the User. This is referred to as the Cost of a False Alarm and denoted as:

$$\mathbb{C}(\text{Decide } F \text{ when really } U) \triangleq \mathbb{C}_{FA}$$

FPS determines a Session is Fraud when in fact it is Fraud. This may be referred to as the Cost of Correct Fraud and denoted as:

$\mathbb{C}$ (Decide F when really F)

FPS determines a Session is User when in fact it is Fraud. This may be referred to as the Cost of Missed Fraud and denoted as:

$$\mathbb{C}(\text{Decide } U \text{ when really } F) \triangleq \mathbb{C}_{Missed}$$

FPS determines a Session is User when in fact it was from the User. This may be referred to as the Cost Correct User and denoted as:

$\mathbb{C}$ (Decide U when really U)

In general, when a decision might be made that a Session is Fraud, the expected cost is:

$$E[\mathbb{C} \mid \text{Decide } F] = \mathbb{C}(\text{Decide } F \text{ when really } U)P(U \mid S_k) + \quad (0.65)$$
$$\mathbb{C}(\text{Decide } F \text{ when really } F)P(F \mid S_k)$$

Likewise, when a decision is made that a Session is from the User, the expected cost is:

$$E[\mathbb{C} \mid \text{Decide } U] = \mathbb{C}(\text{Decide } U \text{ when really } F)P(U \mid S_k) + \quad (0.66)$$
$$\mathbb{C}(\text{Decide } U \text{ when really } F)P(F \mid S_k)$$

Therefore, to minimize the expected cost, the decision criteria is simplified by using:

$$\text{Choose } U \text{ if: } E[\mathbb{C} \mid \text{Decide } F] > E[\mathbb{C} \mid \text{Decide } U] \quad (0.67)$$

and $$\text{Choose } F \text{ if: } E[\mathbb{C} \mid \text{Decide } F] < E[\mathbb{C} \mid \text{Decide } U]$$

And, alternatively:

$$\text{Choose } F \text{ if: } \frac{E[\mathbb{C} \mid \text{Decide } U]}{E[\mathbb{C} \mid \text{Decide } F]} > 1 \quad (0.68)$$

and

Choose $U$ otherwise

The individual costs may represent any cost to the business, including actual fraud losses, resources used to respond an alert and negative impact on the customer if a transaction is stopped. An assumption is made that the cost of making the correct decision is 0, ie, $\mathbb{C}$(Decide F when really F)=$\mathbb{C}$(Decide U when really U)=0. Recognition should be given that the cost of making an incorrect decision can depend on the Session itself (via the associated Activities). Using this, the decision criteria of Equation (0.68) is rewritten as:

$$\frac{\mathbb{C}^{S_k}_{Missed} P(F \mid S_k)}{\mathbb{C}^{S_k}_{FA} P(U \mid S_k)} > 1 \quad (0.69)$$

Using Bayes Rule:

$$\frac{\mathbb{C}^{S_k}_{Missed} P(S_k \mid F^{k-1}) P(F_0)}{\mathbb{C}^{S_k}_{FA} P(S_k \mid U^{k-1}) P(U_0)} > 1 \quad (0.70)$$

Recognizing that the user and fraud priors are related as $P(U_0)=1-P(F_0)$ and that the fraud prior $P(F_0)$ is constant, these terms can be moved into the threshold such that:

$$\theta(S_k)\lambda(S_k) > e^\tau \quad (0.71)$$

or $$\log(\theta(S_k)) + R(S_k) > \tau$$

where $$\theta(S_k) = \frac{\mathbb{C}^{S_k}_{Missed}}{\mathbb{C}^{S_k}_{FA}} \triangleq \text{Cost Ratio}$$

$$\tau = \log\left[\frac{1 - P(F_0)}{P(F_0)}\right]$$

A sufficient statistic can be defined as:

$$R^\theta(S_k) \triangleq \text{Cost Adjusted Risk} \quad (0.72)$$
$$= R(S_k) + \log[\theta(S_k)]$$

In other words, the Cost Adjusted Risk of the Session is a generalization of the simple Risk score that is able to incorporate the cost of different types of sessions. Therefore, the Cost Adjusted Risk for the Session can be used as the primary decision statistic for Sessions.

The cost ratio θ does not depend on the content of the Session (i.e., the costs were the same for all sessions), so it can be moved into the threshold such that the original $R(S_k)$ is a sufficient statistic. This is usually a valid when only considering a single event type like a Login Event.

Activity Model

In general there are many types of activities and an appropriate risk model for an activity type should be based on the nature of the activity. In this section a general model is described that can be used for many types of activities. Other models can be derived and used based on similar logic.

This model described calculates the Risk of an activity based on whether any Activity of the Type (regardless of how many) have been observed in the Session. The Cost contribution can include a base cost, an incremental costs for each observed Activity and a cost that can be tied to a quantitative observed parameter of the Activity (for example, the amount of a money transfer).

The general form for calculating the Risk component from all Activities of a given type (i.e., $A \in \overline{A}_{c^i}$) is as follows:

$$R_{\overline{A}_{c^i}}(S_k) = R^{freq}_{\overline{A}_{c^i}}(S_k) + \sum_{A_j \in \overline{A}_{c^i}} R^{params}_{A_j}(S_k) \quad (0.73)$$

For this Activity Model Template all Activities of the Type should be treated as indistinguishable, i.e., $P(V \mid C, F^{k-1}) = P(V \mid C, U^{k-1})$, such that $$R^{params}_{A_j}(S_k) = 0$$

The quantity $R^{freq}_{\overline{A}_{c^i}}(S_k)$ is based on whether an Activity of this type is observed (i.e., $N_{c^i} > 0$) or not observed (i.e., $N_{c^i} = 0$) in this session. This model is derived from a Beta distribution to estimate the likelihood of observing this type of Activity for this User, i.e.:

$$P(\text{Observe } A \in \overline{A}_{c^i} \mid U^{k-1}) = \frac{\alpha \rho_U + \Omega_{c^i \mid U^{k-1}}}{\alpha + \Omega_{total \mid U^{k-1}}} \quad (0.75)$$

$$P(\text{Observe } A \in \overline{A}_{c^i} \mid F^{k-1}) = \rho_F$$

where
- $\rho_F$=fraud_occurance_prior
  - This is the prior probability of seeing this Activity Type within a session given Fraud
- $\rho_U$=user_occurance_prior
  - This is the prior probability of seeing this Activity Type within a session given Fraud
- $\alpha$=alpha_occurance
  - This is the $\alpha$ associated with the Dirichlet Model for the User (in units of number of Sessions)
- $\Omega_{c^i \mid U^{k-1}} \triangleq$ The observed Session occurrences of $c^i$ for $U^{k-1}$
  - This is the observed occurrences (count or preferably the accumulated trust) of prior Sessions for this User that contain this Activity Type
- $\Omega_{total \mid U^{k-1}} \triangleq$ The total observed session occurrences for $U^{k-1}$
  - This is the total number of observed Sessions (count or preferably the accumulated trust) of prior Sessions (regardless of whether this Activity Type was observed)

Using the definitions in Equation (0.75), $R_{\overline{A}_{c^i}}^{freq}(S_k)$ is calculated as:

1. If $S_k$ is open and no Activity of this type has been observed, then (see Equation (0.61):

$$R_{\overline{A}_{c^i}}^{freq}(S_k) = \log\left(\frac{P(N_{c^i} \geq 0 \mid F^{k-1})}{P(N_{c^i} \geq 0 \mid U^{k-1})}\right) \quad (0.76)$$

$$= \log\left(\frac{1}{1}\right)$$

$$= 0$$

2. If $S_k$ is closed and no Activity of this type has been observed, then:

$$R_{\overline{A}_{c^i}}^{freq}(S_k) = \log\left[\frac{1 - P(\text{Observe } A \in \overline{A}_{c^i} \mid F^{k-1})}{1 - P(\text{Observe } A \in \overline{A}_{c^i} \mid U^{k-1})}\right] \quad (0.77)$$

$$= \log\left[\frac{(1 - \rho_F)(\alpha + \Omega_{total \mid U^{k-1}})}{\alpha(1 - \rho_U) + (\Omega_{total \mid U^{k-1}} - \Omega_{c^i \mid U^{k-1}})}\right]$$

3. If there has been at least one Activity of this type observed (regardless of whether $S_k$ is open or closed), then:

$$R_{\overline{A}_{c^i}}^{freq}(S_k) = \log\left[\frac{P(\text{Observe } A \in \overline{A}_{c^i} \mid F^{k-1})}{P(\text{Observe } A \in \overline{A}_{c^i} \mid U^{k-1})}\right] \quad (0.78)$$

$$= \log\left[\rho_F \frac{\alpha + \Omega_{total \mid U^{k-1}}}{\alpha \rho_U + \Omega_{c^i \mid U^{k-1}}}\right]$$

The Missed Fraud and False Alarm Cost model uses a general parameterized form that can be used to model a variety of situations. Specifically (for the Fraud Cost):

$$\mathbb{C}_{Missed}^{c^i} = \beta_{type}^{Missed} + \beta_{count}^{Missed} N_{c^i} + \sum_{A_j \in \overline{A}_{c^i}} \beta_{quant}^{Missed} V_{quantifier}^{A_j} \quad (0.79)$$

where
- $N_{c^i}$ is the number of Activities of Type $c^i$ that have been observed in this Session, including the current Activity
- $V_{quantifier}^{A}$ is the Quantifier parameter associated Activity A
- The $\beta$'s are cost coefficients provided as Activity Model Template Parameters
  - $\beta_{type}^{Missed}$=missed_type_cost
  - $\beta_{count}^{Missed}$=missed_count_cost
  - $\beta_{quant}^{Missed}$=missed_quantifier_cost The False Alarm Cost model uses the same general parameter form, but with a separate set of cost coefficients.

$$\mathbb{C}_{FA}^{c^i} = \beta_{type}^{FA} + \beta_{count}^{FA} N_{c^i} + \sum_{A_j \in \overline{A}_{c^i}} \beta_{quant}^{FA} V_{quantifier}^{A_j} \quad (0.80)$$

where
- The $\beta$'s are cost coefficients provided as Activity Model Template Parameters
  - $\beta_{type}^{FA}$=FA_type_cost
  - $\beta_{count}^{FA}$=FA_count_cost
  - $\beta_{quant}^{FA}$=FA_quantifier_cost The embodiments described herein include a method comprising: automatically generating a causal model corresponding to a user; estimating a plurality of components of the causal model using event parameters of a first set of events undertaken by the user in an account of the user; and predicting expected behavior of the user during a second set of events using the causal model.

Automatically generating the causal model of an embodiment includes generating statistical relationships between components of the plurality of components.

The method of an embodiment comprises representing the causal model as a Bayesian network.

Automatically generating the causal model of an embodiment includes generating a joint probability distribution that includes the plurality of components.

The plurality of components of an embodiment includes a plurality of probability distribution functions that represent the event parameters.

The event parameters of an embodiment are observable parameters collected during the first set of events.

The event parameters of an embodiment include one or more of Internet Protocol (IP) data and Hypertext Transfer Protocol (HTTP) data.

The IP data of an embodiment includes one or more of an IP address, IP address country, IP address city, IP network block, and internet service provider supporting an event.

The HTTP data of an embodiment includes one or more of data of an operating system, a user agent string, a referrer string, and internet browser of a computer used for an event.

Automatically generating the causal model of an embodiment includes generating statistical relationships between the event parameters and derived parameters.

The derived parameters of an embodiment include one or more of geographic area from which a device is initiating the second set of events, location of the device, identification of the device, and electronic service provider of the device.

Predicting the expected behavior of the user of an embodiment includes generating expected event parameters of the second set of events.

Generating the expected event parameters of an embodiment includes generating a first set of predicted probability distributions that represent the expected event parameters, wherein generating the first set of predicted probability distributions assumes the user is conducting the second set of events.

The method of an embodiment comprises receiving a predictive fraud model. The method of an embodiment comprises generating a second set of predicted probability distributions that represent expected fraud event parameters, wherein generating the second set of predicted probability distributions assumes a fraudster is conducting the second set of events, wherein the fraudster is any person other than the user.

The method of an embodiment comprises automatically generating the predictive fraud model by estimating a plurality of fraud components of the predictive fraud model using fraud event parameters of previous fraudulent events undertaken in a plurality of accounts, wherein the previous fraudulent events are events suspected as having been conducted by the fraudster.

Automatically generating the predictive fraud model of an embodiment includes generating statistical relationships between fraud components of the plurality of fraud components.

Automatically generating the predictive fraud model of an embodiment includes generating statistical relationships between the fraud event parameters and derived fraud parameters.

The derived fraud parameters of an embodiment include one or more of a location of the device, identification of the device, and electronic service provider of the device.

The method of an embodiment comprises generating in real-time a risk score of an event of the second set of events using the expected event parameters and the expected fraud event parameters along with the observed parameters.

The method of an embodiment comprises generating an alert corresponding to an event of the second set of events when the expected behavior indicates a person other than the user is conducting the event.

The method of an embodiment comprises automatically updating the causal model using a second set of event parameters collected during the second set of events.

The second set of event parameters of an embodiment are observable parameters collected during the second set of events.

Automatically updating the causal model of an embodiment includes updating a joint probability distribution that includes the plurality of components.

Automatically updating the causal model of an embodiment includes updating at least one of the plurality of components.

Automatically updating the causal model of an embodiment includes updating at least one of a plurality of probability distribution functions that represent the event parameters, the updating modifying the at least one of the plurality of probability distribution functions by considering data of the second set of event parameters.

The method of an embodiment comprises generating a probability distribution function for each of the event parameters of the first set of events. The method of an embodiment comprises generating an updated probability distribution function for each of the event parameters by applying data of a second set of event parameters of the second set of events to the probability distribution function.

The method of an embodiment comprises receiving a baseline causal model that corresponds to the user, the baseline causal model generated without using data of any event. The method of an embodiment comprises generating the causal model by generating a joint probability distribution that includes the plurality of components, wherein the plurality of components includes the updated probability distribution function for any event parameter represented in the causal model.

The first set of events and the second set of events of an embodiment comprise at least one of online events, offline events, and multiple channel events.

Online events of an embodiment are events undertaken via electronic access to the account.

Events of an embodiment comprise login events.

Events of an embodiment comprise activity events.

A set of events of an embodiment comprises a session, wherein the session is a sequence of related events.

The sequence of related events of an embodiment comprises a session login event and a termination event.

The sequence of related events of an embodiment comprises at least one activity event.

The method of an embodiment comprises determining probabilistically that the second set of events was conducted by the user. The method of an embodiment comprises automatically updating the causal model using a second set of event parameters collected during the second set of events.

The method of an embodiment comprises updating the causal model to include a trust factor, the trust factor representing a probability that the second set of events was in fact conducted by the user.

The method of an embodiment comprises updating the causal model to include an accumulated trust factor, the accumulated trust factor representing a cumulative probability across a plurality of sets of events that an event parameter in the plurality of sets of events was in fact conducted by the user.

Automatically generating the causal model of an embodiment comprises generating the causal model to include a decay parameter.

The decay parameter of an embodiment comprises an exponential decay function by which a relative weight of each event in a set of events in the account changes with passage of time since the event.

The embodiments described herein include a method comprising: receiving a plurality of observations corresponding to a first event, the first event including actions taken in an account during electronic access of the account; generating probabilistic relationships between the observations and derived parameters of an owner of the account; automatically generating an account model to include the probabilistic relationships; and estimating actions of the owner during a second event using the account model, wherein the second event follows the first event in time.

The embodiments described herein include a method comprising: automatically generating a causal model corresponding to a user, the generating comprising estimating a plurality of components of the causal model using event parameters of a previous event undertaken by the user in an account of the user; predicting expected behavior of the user during a next event in the account using the causal model, wherein predicting the expected behavior of the user includes generating predicted event parameters of the next event; receiving observed event parameters of the next event; and updating the causal model for use in a future event, the updating comprising regenerating the plurality of components based on a relationship between the expected event parameters and the observed event parameters.

The embodiments described herein include a system comprising a processor executing at least one application, the application receiving event parameters of a first set of events undertaken by the user in an account of the user, the application automatically generating a causal model corresponding to a user by estimating a plurality of components of the causal model using the event parameters of the first set of events, the application using the causal model to output a prediction of expected behavior of the user during a second set of events.

Automatically generating the causal model of an embodiment includes generating statistical relationships between components of the plurality of components.

Automatically generating the causal model of an embodiment includes generating a joint probability distribution that includes the plurality of components.

The plurality of components of an embodiment includes a plurality of probability distribution functions that represent the event parameters.

The event parameters of an embodiment are observable parameters collected during the first set of events.

The event parameters of an embodiment include one or more of Internet Protocol (IP) data and Hypertext Transfer Protocol (HTTP) data.

The IP data of an embodiment includes one or more of an IP address, IP address country, IP address city, IP network block, and internet service provider supporting an event.

The HTTP data of an embodiment includes one or more of data of an operating system, a user agent string, a referrer string, and internet browser of a computer used for an event.

Automatically generating the causal model of an embodiment includes generating statistical relationships between the event parameters and derived parameters.

The derived parameters of an embodiment include one or more of geographic area from which a device is initiating the second set of events, location of the device, identification of the device, and electronic service provider of the device.

Predicting the expected behavior of the user of an embodiment includes generating expected event parameters of the second set of events.

Generating the expected event parameters of an embodiment includes generating a first set of predicted probability distributions that represent the expected event parameters, wherein generating the first set of predicted probability distributions assumes the user is conducting the second set of events.

The system of an embodiment comprises receiving a predictive fraud model. The system of an embodiment comprises generating a second set of predicted probability distributions that represent expected fraud event parameters, wherein generating the second set of predicted probability distributions assumes a fraudster is conducting the second set of events, wherein the fraudster is any person other than the user.

The system of an embodiment comprises generating in real-time a risk score of an event of the second set of events using the expected event parameters and the expected fraud event parameters along with the observed parameters.

The system of an embodiment comprises generating an alert corresponding to an event of the second set of events when the expected behavior indicates a person other than the user is conducting the event.

The system of an embodiment comprises automatically updating the causal model using a second set of event parameters collected during the second set of events.

Automatically updating the causal model of an embodiment includes updating at least one of a plurality of probability distribution functions that represent the event parameters, the updating modifying the at least one of the plurality of probability distribution functions by considering data of the second set of event parameters.

The system of an embodiment comprises generating a probability distribution function for each of the event parameters of the first set of events. The system of an embodiment comprises generating an updated probability distribution function for each of the event parameters by applying data of a second set of event parameters of the second set of events to the probability distribution function.

The first set of events and the second set of events of an embodiment comprise at least one of online events, offline events, and multiple channel events.

Online events of an embodiment are events undertaken via electronic access to the account.

Events of an embodiment comprise login events.

Events of an embodiment comprise activity events.

A set of events of an embodiment comprises a session, wherein the session is a sequence of related events.

The system of an embodiment comprises determining probabilistically that the second set of events was conducted by the user. The system of an embodiment comprises automatically updating the causal model using a second set of event parameters collected during the second set of events.

The system of an embodiment comprises updating the causal model to include a trust factor, the trust factor representing a probability that the second set of events was in fact conducted by the user.

The system of an embodiment comprises updating the causal model to include an accumulated trust factor, the accumulated trust factor representing a cumulative probability across a plurality of sets of events that an event parameter in the plurality of sets of events was in fact conducted by the user.

Automatically generating the causal model of an embodiment comprises generating the causal model to include a decay parameter.

The decay parameter of an embodiment comprises an exponential decay function by which a relative weight of each event in a set of events in the account changes with passage of time since the event.

The embodiments described herein include a system comprising a processor executing at least one application, the application receiving event parameters of a first set of events undertaken by a user in an account of the user, the application automatically generating an account model corresponding to the user, the account model comprising a plurality of components, wherein generating the account model comprises generating the plurality of components using the event parameters of the first set of events, the application predicting expected behavior of the user during a second set of events using the account model, the application generating an updated version of the account model for use in a future set of events, the updating comprising regenerating the plurality of components using the second set of events.

The embodiments described herein include a method comprising: automatically generating a causal model corresponding to a user, the generating comprising estimating a plurality of components of the causal model using event parameters of a previous event undertaken by the user in an account of the user; predicting expected behavior of the user during a next event in the account using the causal model, wherein predicting the expected behavior of the user includes generating expected event parameters of the next event; using a predictive fraud model, generating fraud event parameters, wherein generating the fraud event parameters assumes a fraudster is conducting the next event, wherein the fraudster is any person other than the user; and generating a risk score of the next event using the expected event parameters and the fraud event parameters, the risk score indicating the relative likelihood the future event is performed by the user versus the fraudster.

The method of an embodiment comprises automatically generating the predictive fraud model by estimating a plurality of fraud components of the predictive fraud model using the fraud event parameters of previous fraudulent events undertaken in a plurality of accounts, wherein the previous fraudulent events are events suspected as having been conducted by the fraudster.

Automatically generating the predictive fraud model of an embodiment includes generating statistical relationships between fraud components of the plurality of fraud components.

Automatically generating the predictive fraud model of an embodiment includes generating a joint probability distribution that includes the plurality of fraud components.

The plurality of fraud components of an embodiment includes a plurality of fraud probability distribution functions that represent the fraud event parameters.

The fraud event parameters of an embodiment are observable fraud parameters collected during the previous fraudulent events.

Automatically generating the predictive fraud model of an embodiment includes generating statistical relationships between the fraud event parameters and derived fraud parameters.

The derived fraud parameters of an embodiment include one or more of a location of the device, identification of the device, and electronic service provider of the device.

The method of an embodiment comprises generating the predictive fraud model.

Generating the predictive fraud model of an embodiment comprises generating an original fraud model to include a probability of observing an event given that the event is caused by the fraudster and absent any other information about the event Generating the predictive fraud model of an embodiment comprises generating a probabilistic combination of the original fraud model and an impersonation model.

The method of an embodiment comprises generating the original fraud model to include a probability of observing an event given that the event is caused by the fraudster and absent any other information about the event.

Generating the predictive fraud model of an embodiment comprises generating the predictive fraud model to include an impersonation probability, wherein the impersonation probability is a probability that the fraudster successfully impersonates a parameter value of an event parameter of a set of events undertaken by the user.

The impersonation model of an embodiment comprises a probability that the fraudster mimics an event parameter of a set of events undertaken by the user.

The impersonation model of an embodiment comprises a probability that the fraudster observes an event parameter of a set of events undertaken by the user.

The method of an embodiment comprises identifying at least one previous fraud event, a previous fraud event comprising a previous event in the account potentially caused by the fraudster. The method of an embodiment comprises generating the original fraud model by estimating a plurality of components of the fraud model using event parameters of at least one previous fraud event undertaken in the account, the at least one previous fraud event potentially conducted by the fraudster.

The method of an embodiment comprises modifying the predictive fraud model based on at least one previous event potentially conducted by the fraudster.

The method of an embodiment comprises generating the predictive fraud model to include a fraud co-occurrence coefficient for at least one previous event potentially conducted by the fraudster.

The fraud co-occurrence coefficient of an embodiment represents an accumulated mistrust derived recursively from the at least one previous event potentially conducted by the fraudster.

The fraud co-occurrence coefficient of an embodiment comprises a coefficient representing an affect of a plurality of previous events potentially conducted by the fraudster.

Automatically generating the causal model of an embodiment includes generating statistical relationships between components of the plurality of components.

Automatically generating the causal model of an embodiment includes generating a joint probability distribution that includes the plurality of components.

The plurality of components of an embodiment includes a plurality of probability distribution functions that represent the event parameters of the previous event.

The event parameters of an embodiment are observable parameters collected during the previous event.

The event parameters of an embodiment include one or more of Internet Protocol (IP) data and Hypertext Transfer Protocol (HTTP) data.

The IP data of an embodiment includes one or more of an IP address, IP address country, IP address city, IP network block, and internet service provider supporting an event.

The HTTP data of an embodiment includes one or more of data of an operating system, a user agent string, a referrer string, and internet browser of a computer used for an event.

Automatically generating the causal model of an embodiment includes generating statistical relationships between the event parameters and derived parameters.

The derived parameters of an embodiment include one or more of geographic area from which a device is initiating the next event, location of the device, identification of the device, and electronic service provider of the device.

Predicting the expected behavior of the user of an embodiment includes generating expected event parameters of the next event.

Generating the expected event parameters of an embodiment includes generating a first set of predicted probability distributions that represent the expected event parameters, wherein generating the first set of predicted probability distributions assumes the user is conducting the next event.

The method of an embodiment comprises generating an alert corresponding to the next event when the risk score indicates a person other than the user is conducting the next event.

The method of an embodiment comprises automatically updating the causal model using a second set of event parameters collected during the next event.

The second set of event parameters of an embodiment is observable parameters collected during the next event.

Automatically updating the causal model of an embodiment includes updating a joint probability distribution that includes the plurality of components.

Automatically updating the causal model of an embodiment includes updating at least one of the plurality of components.

Automatically updating the causal model of an embodiment includes updating at least one of a plurality of probability distribution functions that represent the event parameters, the updating modifying the at least one of the plurality of probability distribution functions by considering data of the second set of event parameters.

The method of an embodiment comprises generating a probability distribution function for each of the event parameters of the previous event. The method of an embodiment comprises generating an updated probability distribution function for each of the event parameters by applying data of a second set of event parameters of the next event to the probability distribution function.

The method of an embodiment comprises receiving a baseline causal model that corresponds to the user, the baseline causal model generated without using data of any event. The method of an embodiment comprises generating the causal model by generating a joint probability distribution that includes the plurality of components, wherein the plurality of components includes the updated probability distribution function for any event parameter represented in the causal model.

The previous event and the next event of an embodiment comprise at least one of online events, offline events, and multiple channel events.

Online events of an embodiment are events undertaken via electronic access to the account.

An event of an embodiment comprises a login event.

An event of an embodiment comprises an activity event.

The method of an embodiment comprises determining probabilistically that the next event was conducted by the user. The method of an embodiment comprises automatically updating the causal model using a second set of event parameters collected during the next event.

The method of an embodiment comprises updating the causal model to include a trust factor, the trust factor representing a probability that the next event was in fact conducted by the user.

The method of an embodiment comprises updating the causal model to include an accumulated trust factor, the accumulated trust factor representing a cumulative probability across a plurality of events that an event parameter in the plurality of events was in fact conducted by the user.

Automatically generating the causal model of an embodiment comprises generating the causal model to include a decay parameter.

The decay parameter of an embodiment comprises an exponential decay function by which a relative weight of each event in the account changes with passage of time since the event.

The embodiments described herein include a method comprising: automatically generating an account model corresponding to a user, the generating of the account model using event parameters of a previous event performed by the user in an account of the user to generate predicted distributions of the event parameters for a next event in the account, wherein the account model includes the predicted distributions of the event parameters; receiving observed event parameters of the next event as the next event occurs; generating a first probability using the account model, wherein the first probability is a probability of observing the observed event parameters assuming the user is conducting the next event; generating a second probability using a fraud model, wherein the second probability is a probability of observing the observed event parameters assuming a fraudster is conducting the next event, wherein the fraudster is a person other than the user; and generating a risk score using the first probability and the second probability, the risk score indicating the relative likelihood the next event is performed by the user versus the fraudster.

The embodiments described herein include a method comprising: generating probabilistic relationships between observations of a first event and derived parameters of an owner of an account; automatically generating an account model including the probabilistic relationships; dynamically updating the account model using observations of a second event; and using the account model to predict during a third event whether the owner or a fraudster is perpetuating the third event, wherein an event includes actions taken in the account during electronic access of the account.

The embodiments described herein include a system comprising a processor executing at least one application, the application automatically generating a predictive user model corresponding to a user, wherein the predictive user model includes a plurality of probability distributions representing event parameters observed during a first event in an account of the user, the application generating predicted event parameters using the predictive user model, the predicted event parameters expected to be observed during a second event in the account, the second event following the first event, the application comparing actual event parameters of the second event to the predicted event parameters during the second event and generating an alert corresponding to the second event when the actual event parameters appear to be initiated by a person other than the user.

The embodiments described herein include a system comprising a processor executing at least one application, the application automatically generating a causal model corresponding to a user by estimating a plurality of components of the causal model using event parameters of a previous event undertaken by the user in an account of the user, the application predicting expected behavior of the user during a next event in the account using the causal model, wherein predicting the expected behavior of the user includes generating expected event parameters of the next event, the application using a predictive fraud model, generating fraud event parameters, wherein generating the fraud event parameters assumes a fraudster is conducting the next event, wherein the fraudster is any person other than the user, the application generating a risk score of the next event using the expected event parameters and the fraud event parameters, the risk score indicating the relative likelihood the future event is performed by the user versus the fraudster.

The system of an embodiment comprises automatically generating the predictive fraud model by estimating a plurality of fraud components of the predictive fraud model using the fraud event parameters of previous fraudulent events undertaken in a plurality of accounts, wherein the previous fraudulent events are events suspected as having been conducted by the fraudster.

Automatically generating the predictive fraud model of an embodiment includes generating statistical relationships between fraud components of the plurality of fraud components.

Automatically generating the predictive fraud model of an embodiment includes generating a joint probability distribution that includes the plurality of fraud components.

The plurality of fraud components of an embodiment includes a plurality of fraud probability distribution functions that represent the fraud event parameters, wherein the fraud event parameters are observable fraud parameters collected during the previous fraudulent events.

Automatically generating the predictive fraud model of an embodiment includes generating statistical relationships between the fraud event parameters and derived fraud parameters.

The derived fraud parameters of an embodiment include one or more of a location of the device, identification of the device, and electronic service provider of the device.

The system of an embodiment comprises generating the predictive fraud model.

Generating the predictive fraud model of an embodiment comprises generating an original fraud model to include a probability of observing an event given that the event is caused by the fraudster and absent any other information about the event Generating the predictive fraud model of an embodiment comprises generating a probabilistic combination of the original fraud model and an impersonation model.

The system of an embodiment comprises generating the original fraud model to include a probability of observing an event given that the event is caused by the fraudster and absent any other information about the event.

Generating the predictive fraud model of an embodiment comprises generating the predictive fraud model to include an impersonation probability, wherein the impersonation probability is a probability that the fraudster successfully impersonates a parameter value of an event parameter of a set of events undertaken by the user.

The impersonation model of an embodiment comprises a probability that the fraudster mimics an event parameter of a set of events undertaken by the user.

The impersonation model of an embodiment comprises a probability that the fraudster observes an event parameter of a set of events undertaken by the user.

The system of an embodiment comprises identifying at least one previous fraud event, a previous fraud event comprising a previous event in the account potentially caused by the fraudster. The system of an embodiment comprises generating the original fraud model by estimating a plurality of components of the fraud model using event parameters of at least one previous fraud event undertaken in the account, the at least one previous fraud event potentially conducted by the fraudster.

The system of an embodiment comprises modifying the predictive fraud model based on at least one previous event potentially conducted by the fraudster.

The system of an embodiment comprises generating the predictive fraud model to include a fraud co-occurrence coefficient for at least one previous event potentially conducted by the fraudster.

The fraud co-occurrence coefficient of an embodiment represents an accumulated mistrust derived recursively from the at least one previous event potentially conducted by the fraudster.

The fraud co-occurrence coefficient of an embodiment comprises a coefficient representing an affect of a plurality of previous events potentially conducted by the fraudster.

Automatically generating the causal model of an embodiment includes generating a joint probability distribution that includes the plurality of components.

The plurality of components of an embodiment includes a plurality of probability distribution functions that represent the event parameters of the previous event.

The event parameters of the previous event of an embodiment are observable parameters collected during the previous event.

The event parameters of the previous event of an embodiment include one or more of Internet Protocol (IP) data and Hypertext Transfer Protocol (HTTP) data.

The IP data of an embodiment includes one or more of an IP address, IP address country, IP address city, IP network block, and internet service provider supporting an event.

The HTTP data of an embodiment includes one or more of data of an operating system, a user agent string, a referrer string, and internet browser of a computer used for an event.

Automatically generating the causal model of an embodiment includes generating statistical relationships between the event parameters and derived parameters.

The derived parameters of an embodiment include one or more of geographic area from which a device is initiating the next event, location of the device, identification of the device, and electronic service provider of the device.

Predicting the expected behavior of the user of an embodiment includes generating expected event parameters of the next event, wherein generating the expected event parameters includes generating a first set of predicted probability distributions that represent the expected event parameters, wherein generating the first set of predicted probability distributions assumes the user is conducting the next event.

The system of an embodiment comprises generating an alert corresponding to the next event when the expected behavior indicates a person other than the user is conducting the next event.

The system of an embodiment comprises automatically updating the causal model using a second set of event parameters collected during the next event, wherein the second set of event parameters is observable parameters collected during the next event.

Automatically updating the causal model of an embodiment includes updating at least one of a plurality of probability distribution functions that represent the event parameters, the updating modifying the at least one of the plurality of probability distribution functions by considering data of the second set of event parameters.

The previous event and the next event of an embodiment comprise at least one of online events, offline events, and multiple channel events, wherein online events are events undertaken via electronic access to the account.

An event of an embodiment comprises at least one of a login event and an activity event.

The system of an embodiment comprises determining probabilistically that the next event was conducted by the user. The system of an embodiment comprises automatically updating the causal model using a second set of event parameters collected during the next event.

The system of an embodiment comprises updating the causal model to include a trust factor, the trust factor representing a probability that the next event was in fact conducted by the user.

The system of an embodiment comprises updating the causal model to include an accumulated trust factor, the accumulated trust factor representing a cumulative probability across a plurality of events that an event parameter in the plurality of events was in fact conducted by the user.

Automatically generating the causal model of an embodiment comprises generating the causal model to include a decay parameter, wherein the decay parameter comprises an exponential decay function by which a relative weight of each event in the account changes with passage of time since the event.

The embodiments described herein include a system comprising: a risk engine executing on a processor and coupled to a financial system that includes an account, the risk engine generating an account model corresponding to a user and events conducted in the account, the generating of the account model using event parameters of a previous event performed by the user in the account to generate predicted distributions of the event parameters for a next event in the account, the risk engine receiving event parameters of the next event as the next event occurs, the risk engine generating a first probability using the account model, wherein the first probability is a probability of observing the event parameters assuming the user is conducting the next event, the risk engine generating a second probability using a fraud model, wherein the second probability is a probability of observing the event parameters assuming a fraudster is conducting the next event, wherein the fraudster is a person other than the user, wherein the events conducted in the account comprise the previous event and the next event, the risk engine generating a risk score using the first probability and the second probability, the risk score indicating the relative likelihood the next event is performed by the user versus the fraudster; and a risk application executing on the processor, the risk application comprising an analytical user interface (AUI), the AUI displaying for any event in the account at least one of the risk score and the event parameters.

The AUI of an embodiment comprises a horizontal axis representing a sequence of events ordered by time.

The AUI of an embodiment comprises a vertical axis representing the event parameters.

The event parameters of an embodiment include one or more of Internet Protocol (IP) data and Hypertext Transfer Protocol (HTTP) data.

The IP data of an embodiment includes one or more of an IP address, IP address country, IP address city, IP network block, and internet service provider supporting an event.

The HTTP data of an embodiment includes one or more of data of an operating system, a user agent string, a referrer string, and internet browser of a computer used for an event.

The AUI of an embodiment comprises a plurality of columns, wherein each column of the plurality of columns represents at lease one event of the events conducted in the account, wherein the plurality of columns are arranged according to date.

The AUI of an embodiment comprises a plurality of rows, wherein a set of rows of the plurality of rows represent event parameters of the events.

The AUI comprises of an embodiment a plurality of intersection regions, each intersection region defined by an intersection of a row of the set of rows and a column, wherein the intersection region corresponds to an event parameter of the at least one event, wherein the intersection region includes color coding relating the event parameter to a corresponding probability of the account model.

The color coding of an embodiment represents a relative likelihood ratio that the event parameter corresponds to the user.

The AUI of an embodiment comprises a risk row representing risk of the event, wherein each intersection region defined by the intersection of the risk row with a column corresponds to the risk score of the at least one event corresponding to the column.

The intersection region of an embodiment includes color coding relating the risk score to the at least one event.

The color coding of an embodiment represents a relative likelihood ratio that the user conducted the at least one event.

The at least one event of an embodiment comprises at least one of an online event, an offline event, and a multiple-channel event.

Online events of an embodiment are events undertaken via electronic access to the account.

The at least one event of an embodiment comprises a login event.

The at least one event of an embodiment comprises an activity event.

The at least one event of an embodiment comprises a session, wherein the session is a sequence of related events.

The sequence of related events of an embodiment comprises a session login event and a termination event.

The sequence of related events of an embodiment comprises at least one activity event following the login event.

Generating the account model of an embodiment includes generating statistical relationships between predicted distributions.

Generating the account model of an embodiment includes generating a joint probability distribution that includes the predicted distributions.

The predicted distributions of an embodiment include a plurality of probability distribution functions that represent the event parameters.

The event parameters of an embodiment are observable parameters collected during the previous event.

Generating the account model of an embodiment includes generating statistical relationships between the event parameters and derived parameters.

The derived parameters of an embodiment include one or more of geographic area from which a device is initiating the next event, location of the device, identification of the device, and electronic service provider of the device.

Generating the risk score of an embodiment includes generating expected event parameters of the next event.

Generating the expected event parameters of an embodiment includes generating a first set of predicted probability distributions that represent the expected event parameters, wherein generating the first set of predicted probability distributions assumes the user is conducting the second set of events.

The system of an embodiment comprises receiving a predictive fraud model. The system of an embodiment comprises generating a second set of predicted probability distributions that represent expected fraud event parameters, wherein generating the second set of predicted probability distributions assumes a fraudster is conducting the next event.

The system of an embodiment comprises automatically generating the predictive fraud model by estimating a plurality of fraud components of the predictive fraud model using fraud event parameters of previous fraudulent events undertaken in a plurality of accounts, wherein the previous fraudulent events are events suspected as having been conducted by the fraudster.

Automatically generating the predictive fraud model of an embodiment includes generating statistical relationships between fraud components of the plurality of fraud components.

Automatically generating the predictive fraud model of an embodiment includes generating statistical relationships between the fraud event parameters and derived fraud parameters.

The derived fraud parameters of an embodiment include one or more of a location of the device, identification of the device, and electronic service provider of the device.

The system of an embodiment comprises generating the predictive fraud model.

Generating the predictive fraud model of an embodiment comprises generating an original fraud model to include a probability of observing an event given that the event is caused by the fraudster and absent any other information about the event Generating the predictive fraud model of an embodiment comprises generating a probabilistic combination of the original fraud model and an impersonation model.

The system of an embodiment comprises generating the original fraud model to include a probability of observing an event given that the event is caused by the fraudster and absent any other information about the event.

Generating the predictive fraud model of an embodiment comprises generating the predictive fraud model to include an impersonation probability, wherein the impersonation probability is a probability that the fraudster successfully impersonates a parameter value of an event parameter of a set of events undertaken by the user.

The impersonation model of an embodiment comprises a probability that the fraudster mimics an event parameter of a set of events undertaken by the user.

The impersonation model of an embodiment comprises a probability that the fraudster observes an event parameter of a set of events undertaken by the user.

The system of an embodiment comprises identifying at least one previous fraud event, a previous fraud event comprising a previous event in the account potentially caused by the fraudster. The system of an embodiment comprises generating the original fraud model by estimating a plurality of components of the fraud model using event parameters of at least one previous fraud event undertaken in the account, the at least one previous fraud event potentially conducted by the fraudster.

The system of an embodiment comprises modifying the predictive fraud model based on at least one previous event potentially conducted by the fraudster.

The system of an embodiment comprises generating the predictive fraud model to include a fraud co-occurrence coefficient for at least one previous event potentially conducted by the fraudster.

The fraud co-occurrence coefficient of an embodiment represents an accumulated mistrust derived recursively from the at least one previous event potentially conducted by the fraudster.

The fraud co-occurrence coefficient of an embodiment comprises a coefficient representing an affect of a plurality of previous events potentially conducted by the fraudster.

The system of an embodiment comprises selectively updating the account model using a second set of event parameters collected during the next event.

The second set of event parameters of an embodiment is observable parameters collected during the next event.

Automatically updating the account model of an embodiment includes updating a joint probability distribution that includes a plurality of components of the account model.

Automatically updating the account model of an embodiment includes updating at least one of a plurality of components of the account model.

Automatically updating the account model of an embodiment includes updating at least one of a plurality of probability distribution functions that represent the event parameters, the updating modifying the at least one of the plurality of probability distribution functions by considering data of the second set of event parameters.

The system of an embodiment comprises generating a probability distribution function for each of the event parameters of the prior event. The system of an embodiment comprises generating an updated probability distribution function for each of the event parameters by applying data of a second set of event parameters of the next event to the probability distribution function.

The system of an embodiment comprises receiving a baseline account model that corresponds to the user, the baseline account model generated without using data of any event. The system of an embodiment comprises generating the account model by generating a joint probability distribution that includes a plurality of components of the account model, wherein the plurality of components includes the updated probability distribution function for any event parameter represented in the account model.

The previous event and the next event of an embodiment comprise at least one of online events, offline events, and multiple channel events.

Online events of an embodiment are events undertaken via electronic access to the account.

Events of an embodiment comprise login events.

Events of an embodiment comprise activity events.

The events of an embodiment comprise a session, wherein the session is a sequence of related events.

The sequence of related events of an embodiment comprises a session login event and a termination event.

The sequence of related events of an embodiment comprises at least one activity event.

The system of an embodiment comprises determining probabilistically that the next event was conducted by the user. The system of an embodiment comprises automatically updating the account model using a second set of event parameters collected during the next event.

The system of an embodiment comprises updating the account model to include a trust factor, the trust factor representing a probability that the next event was in fact conducted by the user.

The system of an embodiment comprises updating the account model to include an accumulated trust factor, the accumulated trust factor representing a cumulative probability across a plurality of events that an event parameter in the plurality of events was in fact conducted by the user.

Automatically generating the account model of an embodiment comprises generating the account model to include a decay parameter.

The decay parameter of an embodiment comprises an exponential decay function by which a relative weight of each event of the events in the account changes with passage of time since the event.

The embodiments described herein include a system comprising: a risk engine executing on a processor, the risk engine receiving from a financial system observations corresponding to a prior event, the prior event including actions taken in an account of the financial system during electronic access of the account, the risk engine estimating parameters of an account model using the observations and dynamically generating an account model to include the parameters, the account model corresponding only to the user, the risk engine using output of the account model to generate a risk score that is a relative likelihood an event in the account following the prior event is performed by the user versus the fraudster; and a risk application executing on the processor, the risk application comprising an analytical user interface (AUI), the AUI displaying for any event in the account at least one of the risk score and event parameters of any event in the account.

Aspects of the FPS described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the FPS include: microcontrollers with memory (such as electronically erasable programmable read only memory (EEPROM)), embedded microprocessors, firmware, software, etc. Furthermore, aspects of the FPS may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the FPS is not intended to be exhaustive or to limit the systems and methods to the precise forms disclosed. While specific embodiments of, and examples for, the FPS are described herein for illustrative purposes, various equivalent modifications are possible within the scope of the systems and methods, as those skilled in the relevant art will recognize. The teachings of the FPS provided herein can be applied to other systems and methods, not only for the systems and methods described above.

The elements and acts of the various embodiments described above can be combined to provide further embodiments. These and other changes can be made to the FPS in light of the above detailed description.

In general, in the following claims, the terms used should not be construed to limit the FPS to the specific embodiments disclosed in the specification and the claims, but should be construed to include all systems that operate under the claims. Accordingly, the FPS is not limited by the disclosure, but instead the scope of the FPS is to be determined entirely by the claims.

While certain aspects of the FPS are presented below in certain claim forms, the inventors contemplate the various aspects of the FPS in any number of claim forms. Accordingly, the inventors reserve the right to add additional claims after filing the application to pursue such additional claim forms for other aspects of the FPS.

What is claimed is:

1. A method comprising:
automatically generating, with at least one processor, a predictive user model representing non-fraudulent activities undertaken by a user in multiple channels in association with an account of the user by transforming data representing the non-fraudulent activities of the user into relationships forming the predictive user model, wherein automatically generating the predictive user model comprises:
generating, with the at least one processor, a plurality of components of the predictive user model from event parameters associated with a first set of events undertaken by the user when the user electronically accesses information associated with the account of the user, wherein the event parameters comprise data associated with the non-fraudulent activities undertaken by the user when the user electronically accesses information associated with an account of the user via a plurality of channels of the multiple channels that is collected during the first set of events, wherein the event parameters comprise IP address data or HTTP data and information associated with an ATM, information associated with a call center system, or information associated with an offline interaction, and wherein
the IP address data or HTTP data comprises one or more of:
IP address data or HTTP data associated with a login event of a session involving the user,
IP address data or HTTP data associated with a termination event of a session involving the user,
IP address data or HTTP data associated with an account access event of a session involving the user,
IP address data or HTTP data associated with an activity event during a session involving the user,
or any combination thereof;
predicting, with the at least one processor and based on generating the plurality of components of the predictive user model, expected behavior of the user during a second set of events using the predictive user model, wherein the second set of events is associated with the non-fraudulent activities undertaken by the user when the user electronically accesses the account of the user, wherein predicting the expected behavior of the user during the second set of events comprises:
generating a statistical relationship between the event parameters associated with the first set of events and derived parameters, wherein the derived parameters include one or more of:
a geographic area from which a first device having the IP address data or identified by the HTTP data, that is conducting a session involving the user during the first set of events,
a location within the geographic area of the first device having the IP address data or identified by the HTTP data, that is conducting a session involving the user during the first set of events,
an identification of the first device having the IP address data or identified by the HTTP data, that is conducting a session involving the user during the first set of events,
an electronic service provider of the first device having the IP address data or identified by the HTTP data, that is conducting a session involving the user during the first set of events, or
any combination thereof;
generating, with the at least one processor and from data representing fraudulent activities of a plurality of fraudsters in a plurality of third party accounts, a predictive fraud model;
generating, with the at least one processor, data representing a prediction of expected behavior of a fraudster associated with a third set of events using the predictive fraud model, wherein the third set of events is associated with fraudulent activities undertaken by the fraudster in association with an additional account, wherein the predictive fraud model is independent of the predictive user model and is generated using the data representing the fraudulent activities of the plurality of fraudsters in the plurality of third party accounts; and
calculating, with the at least one processor, a risk score associated with at least one fourth event that is conducted in real-time, wherein the risk score comprises an indication that the at least one fourth event is performed by the user instead of the fraudster, where the at least one fourth event is associated with electronically accessing the account of the user, wherein calculating the risk score comprises:
calculating the risk score by comparing the expected behavior of the user during the second set of events predicted using the predictive user model, the data representing the prediction of expected behavior of the fraudster associated with the third set of events generated using the predictive fraud model, and IP address data or HTTP data of a second device conducting a session associated with the at least one fourth event; and
generating, with the at least one processor, an alert associated with the account of the user based on calculating the risk score associated with the at least one fourth event.

2. The method of claim 1, wherein automatically generating the predictive user model includes generating statistical relationships between components of the plurality of components.

3. The method of claim 1, comprising representing the predictive user model as a Bayesian network.

4. The method of claim 1, wherein automatically generating the predictive user model includes generating a joint probability distribution that includes the plurality of components.

5. The method of claim 4, wherein the plurality of components includes a plurality of probability distribution functions that represent the event parameters.

6. The method of claim 5, wherein the event parameters are observable parameters collected during the first set of events.

7. The method of claim 1, wherein the IP address data includes one or more of an IP address, IP address country, IP address city, IP network block, and internet service provider supporting an event of the first set of events.

8. The method of claim 1, wherein the HTTP data includes one or more of data of an operating system, a user agent string, a referrer string, and internet browser of a computer used for an event.

9. The method of claim 1, wherein predicting the expected behavior of the user includes generating expected event parameters of the second set of events.

10. The method of claim 9, wherein generating the expected event parameters includes generating a first set of predicted probability distributions that represent the expected event parameters, wherein generating the first set of predicted probability distributions assumes the user is conducting the second set of events.

11. The method of claim 10, comprising generating a second set of predicted probability distributions that represent expected fraud event parameters, wherein generating the second set of predicted probability distributions assumes the fraudster is conducting the second set of events, wherein the fraudster is any person other than the user, generating in real-time a risk score of an event of the second set of events using the expected event parameters and the expected fraud event parameters.

12. The method of claim 1, comprising:
receiving the predictive fraud model; and
generating a second set of predicted probability distributions that represent expected fraud event parameters, wherein generating the second set of predicted probability distributions assumes the fraudster is conducting the second set of events, wherein the fraudster is any person other than the user.

13. The method of claim 12, comprising automatically generating the predictive fraud model by estimating a plurality of fraud components of the predictive fraud model using fraud event parameters of previous fraudulent events undertaken in a plurality of accounts, wherein the previous fraudulent events are events suspected as having been conducted by the fraudster.

14. The method of claim 13, wherein automatically generating the predictive fraud model includes generating statistical relationships between fraud components of the plurality of fraud components.

15. The method of claim 13, wherein automatically generating the predictive fraud model includes generating statistical relationships between the fraud event parameters and derived fraud parameters.

16. The method of claim 15, wherein the derived fraud parameters include one or more of a location of the device, identification of the device, and electronic service provider of the device.

17. The method of claim 1, comprising generating an alert corresponding to an event of the second set of events when the expected behavior indicates a person other than the user is conducting the event.

18. The method of claim 1, comprising automatically updating the predictive user model using a second set of event parameters collected during the second set of events.

19. The method of claim 18, wherein the second set of event parameters are observable parameters collected during the second set of events.

20. The method of claim 18, wherein automatically updating the predictive user model includes updating a joint probability distribution that includes the plurality of components.

21. The method of claim 18, wherein automatically updating the predictive user model includes updating at least one of the plurality of components.

22. The method of claim 18, wherein automatically updating the predictive user model includes updating at least one of a plurality of probability distribution functions that represent the event parameters, the updating modifying the at least one of the plurality of probability distribution functions by considering data of the second set of event parameters.

23. The method of claim 18, comprising:
generating a probability distribution function for each of the event parameters of the first set of events; and
generating an updated probability distribution function for each of the event parameters by applying data of a second set of event parameters of the second set of events to the probability distribution function.

24. The method of claim 23, comprising:
receiving a baseline predictive user model that corresponds to the user, the baseline predictive user model generated without using data of any event; and
generating the predictive user model by generating a joint probability distribution that includes the plurality of components, wherein the plurality of components includes the updated probability distribution function for any event parameter represented in the predictive user model.

25. The method of claim 1, wherein the first set of events and the second set of events comprises at least one of online events, offline events, and multiple channel events.

26. The method of claim 25, wherein online events are events undertaken via electronic access to the account.

27. The method of claim 1, comprising:
determining probabilistically that the second set of events was conducted by the user; and
automatically updating the predictive user model using a second set of event parameters collected during the second set of events.

28. The method of claim 27, comprising updating the predictive user model to include a trust factor, the trust factor representing a probability that the second set of events was in fact conducted by the user.

29. The method of claim 27, comprising updating the predictive user model to include an accumulated trust factor, the accumulated trust factor representing a cumulative probability across a plurality of sets of events that an event parameter in the plurality of sets of events was in fact conducted by the user.

30. The method of claim 1, wherein automatically generating the predictive user model comprises generating the predictive user model to include a decay parameter.

31. The method of claim 30, wherein the decay parameter comprises an exponential decay function by which a relative weight of each event in a set of events in the account changes with passage of time since the event.

32. A system comprising:
one or more processors programmed or configured to:
automatically generate a predictive user model representing non-fraudulent activities undertaken by a user in multiple channels in association with an account of the user by transforming data representing the non-fraudulent activities of the user into relationships forming the predictive user model, wherein, when automatically generating the predictive user model, the one or more processors are programmed or configured to:
generate a plurality of components of the predictive user model from event parameters associated with a first set of events undertaken by the user when the user electronically accesses information associated with the account of the user, wherein the event parameters comprise data associated with the non-fraudulent activities undertaken by the user when the user electronically accesses information associated with an account of the user via a plurality of channels of the multiple channels that is collected during the first set of events, wherein the event parameters comprise IP address data or HTTP data and information associated with an ATM, information associated with a call center system, or information associated with an offline interaction and wherein
the IP address data or HTTP data comprises one or more of:
IP address data or HTTP data associated with a login event of a session involving the user,
IP address data or HTTP data associated with a termination event of a session involving the user,
IP address data or HTTP data associated with an account access event of a session involving the user,
IP address data or HTTP data associated with an activity event during a session involving the user, or
any combination thereof;
determine, based on generating the plurality of components of the predictive user model, expected behavior of the user during a second set of events using the predictive user model, wherein the second set of events is associated with non-fraudulent activities undertaken by the user when the user electronically accesses the account of the user, wherein when determining the expected behavior of the user during the second set of events, the one or more processors are programmed or configured to:
generate a statistical relationship between the event parameters associated with the first set of events and derived parameters, wherein the derived parameters include one or more of:
a geographic area from which a first device having the IP address data or identified by the HTTP data, that is conducting a session involving the user during the first set of events,
a location within the geographic area of the first device having the IP address data or identified by the HTTP data, that is conducting a session involving the user during the first set of events,
an identification of the first device having the IP address data or identified by the HTTP data, that is conducting a session involving the user during the first set of events,
an electronic service provider of the first device having the IP address data or identified by the HTTP data, that is conducting a session involving the user during the first set of events, or
any combination thereof;
generate, based on data representing fraudulent activities of a plurality of fraudsters in a plurality of third party accounts during a third time interval, a predictive fraud model;
generate data representing a prediction of expected behavior of a fraudster associated with a third set of events using the predictive fraud model, wherein the third set of events is associated with fraudulent activities undertaken by the fraudster in association with an additional account, wherein the predictive fraud model is independent of the predictive user model and is generated using the data representing the fraudulent activities of the plurality of fraudsters in the plurality of third party accounts;
calculate a risk score associated with at least one fourth event that is conducted in real-time, wherein the risk score comprises an indication that the at least one fourth event is performed by the user instead of the fraudster, where the at least one fourth event is associated with electronically accessing the account of the user, and wherein when calculating the risk score associated with the at least one fourth event, the one or more processors are programmed or configured to:
calculate the risk score by comparing the expected behavior of the user during the second set of events predicted using the predictive user model, the data representing the prediction of expected behavior of the fraudster associated with the third set of events generated using the predictive fraud model, and IP address data or HTTP data of a second device conducting a session associated with the at least one fourth event; and
generate an alert associated with the account of the user based on calculating the risk score associated with the at least one fourth event.

33. A computer program product comprising at least one non-transitory computer-readable medium including one or more instructions that, when executed by at least one processor, cause the at least one processor to:
automatically generate a predictive user model representing non-fraudulent activities undertaken by a user in multiple channels in association with an account of the user by transforming data representing the non-fraudulent activities of the user into relationships forming the predictive user model, wherein the one or more instructions that cause the at least one processor to automatically generating the predictive user model cause the at least one processor to:
generate a plurality of components of the predictive user model from event parameters associated with a first set of events undertaken by the user when the user electronically accesses information associated with the account of the user, wherein the event parameters comprise data associated with the non-fraudulent activities undertaken by the user when the user electronically accesses information associated with an account of the user via a plurality of channels of the multiple channels that is collected during the first set of events, wherein the event parameters comprise IP address data or HTTP data and information associated with an ATM, information associated with a call center system, or information associated with an offline interaction and wherein the IP address data or HTTP data comprises one or more of:
IP address data or HTTP data associated with a login event of a session involving the user,
IP address data or HTTP data associated with a termination event of a session involving the user,
IP address data or HTTP data associated with an account access event of a session involving the user,
IP address data or HTTP data associated with an activity event during a session involving the user, or
any combination thereof;
determine, based on generating the plurality of components of the predictive user model, expected behavior of the user during a second set of events using the predictive user model, wherein the second set of events is associated with non-fraudulent activities undertaken by the user when the user electronically accesses the account of the user, wherein, the one or more instructions that cause the at least one processor to determine the expected behavior of the user, cause the at least one processor to:
generate a statistical relationship between the event parameters associated with the first set of events and derived parameters, wherein the derived parameters include one or more of:
a geographic area from which a first device having the IP address data or identified by the HTTP data, that is conducting a session involving the user during the first set of events,
a location within the geographic area of the first device having the IP address data or identified by the HTTP data, that is conducting a session involving the user during the first set of events,
an identification of the first device having the IP address data or identified by the HTTP data, that is conducting a session involving the user during the first set of events,
an electronic service provider of the first device having the IP address data or identified by the HTTP data, that is conducting a session involving the user during the first set of events, or
any combination thereof;
generate, based on data representing fraudulent activities of a plurality of fraudsters in a plurality of third party accounts during a third time interval, a predictive fraud model;
generate data representing a prediction of expected behavior of a fraudster associated with a third set of events using the predictive fraud model, wherein the third set of events is associated with fraudulent activities undertaken by the fraudster in association with an additional account, wherein the predictive fraud model is independent of the predictive user model and is generated using the data representing the fraudulent activities of the plurality of fraudsters in the plurality of third party accounts;
calculate a risk score associated with at least one fourth event that is conducted in real-time, wherein the risk score comprises an indication that the at least one fourth event is performed by the user instead of the fraudster, where the at least one fourth event is associated with electronically accessing the account of the user, and wherein the one or more instructions that cause the at least one processor to calculate the risk score cause the at least one processor to:
calculate the risk score by comparing the expected behavior of the user during the second set of events predicted using the predictive user model, the data representing the prediction of expected behavior of the fraudster associated with the third set of events generated using the predictive fraud model, and IP address data of a second device conducting a session associated with the at least one fourth event; and generate an alert associated with the account of the user based on calculating the risk score associated with the at least one fourth event.

* * * * *